(12) United States Patent
Stephens et al.

(10) Patent No.: US 12,321,474 B2
(45) Date of Patent: Jun. 3, 2025

(54) PARTITIONING, PROCESSING, AND PROTECTING MEDIA DATA

(71) Applicant: AirMettle, Inc., Houston, TX (US)

(72) Inventors: Donpaul C. Stephens, Houston, TX (US); Qiang Zhang, Bryan, TX (US); Zhiying Gu, Berkeley, CA (US); Feilian Huang, Atlanta, GA (US); Shiyao Shen, Atlanta, GA (US); Jiaxin Li, Houston, TX (US)

(73) Assignee: AirMettle, Inc., Houston, TX (US)

( * ) Notice: Subject to any disclaimer, the term of this patent is extended or adjusted under 35 U.S.C. 154(b) by 206 days.

(21) Appl. No.: 17/896,922

(22) Filed: Aug. 26, 2022

(65) Prior Publication Data
US 2023/0076014 A1   Mar. 9, 2023

Related U.S. Application Data

(60) Provisional application No. 63/237,766, filed on Aug. 27, 2021.

(51) Int. Cl.
*G06F 21/62* (2013.01)
*H04N 21/2312* (2011.01)
*H04N 21/845* (2011.01)

(52) U.S. Cl.
CPC ..... *G06F 21/6218* (2013.01); *H04N 21/2312* (2013.01); *H04N 21/8456* (2013.01)

(58) Field of Classification Search
CPC . G06F 21/6218; G06F 16/71; H04N 21/2312; H04N 21/8456; H04N 21/2181; H04N 21/23116; H04N 21/85406
See application file for complete search history.

(56) References Cited

U.S. PATENT DOCUMENTS

| | | |
|---|---|---|
| 9,426,219 B1 | 8/2016 | Keyser |
| 9,477,651 B2 | 10/2016 | Agarwal et al. |
| 9,507,843 B1 | 11/2016 | Madhavarapu et al. |
| 9,965,539 B2 | 5/2018 | D'Halluin et al. |
| 10,270,823 B2 | 4/2019 | Stockhammer et al. |
| 10,469,860 B1 | 11/2019 | Zhang et al. |
| 10,983,973 B2 | 4/2021 | Kunnatur et al. |
| 11,030,171 B2 | 6/2021 | Shahane et al. |
| 2004/0210948 A1 | 10/2004 | Jin et al. |
| 2012/0079364 A1 | 3/2012 | Agarwal et al. |

(Continued)

FOREIGN PATENT DOCUMENTS

AU      2015221573        9/2015
WO      WO-2009137919 A1 * 11/2009  ........... G11B 27/031

OTHER PUBLICATIONS

"ffmpeg Documentation", downloaded Jul. 28, 2021 from https://www.ffmpeg.org/ffmpeg.html, 47 pages.

(Continued)

*Primary Examiner* — Anthony Bantamoi
(74) *Attorney, Agent, or Firm* — BainwoodHuang

(57) ABSTRACT

A technique for managing data objects in a storage cluster includes splitting a media data object into multiple portions at boundaries within the media data object. The technique further includes transforming the portions of the media data object into segments that provide individually processable units and distributing the segments among multiple computing nodes of the storage cluster for storage therein.

26 Claims, 23 Drawing Sheets

(56) References Cited

U.S. PATENT DOCUMENTS

| | | | |
|---|---|---|---|
| 2012/0089562 | A1 | 4/2012 | Deremigio et al. |
| 2019/0080723 | A1 | 3/2019 | Ahsan et al. |
| 2019/0089967 | A1* | 3/2019 | White .................... H04N 19/34 |
| 2020/0125751 | A1 | 4/2020 | Hariharasubrahmanian et al. |
| 2022/0321970 | A1* | 10/2022 | Swanson .......... H04N 21/47217 |
| 2023/0065773 | A1* | 3/2023 | Dimitriou ........ H04N 21/23418 |

OTHER PUBLICATIONS

"MP4 File Format", downloaded Nov. 1, 2022 from https://web.archive.org/web/20210124103047/https://docs.fileformat.com/video/mp4/, which provides an archived version dated Jan. 24, 2021, 3 pages.

Elements of the H.264 Video/ACC Audio MP4 Movie; Application Note AN101; Cimarron Systems, Apr. 28, 2014, 18 pages.

International Search Report and Written Opinion, International Application No. PCT/US2021/031965, dated Aug. 4, 2021, 16 pages.

Muhmud, Mohammad Sultan et al., "A survey of data partitioning and sampling methods to support big data analysis", Big Data Mining and Analytics, vol. 3, No. 1, pp. 85-101, Feb. 27, 2020.

Armbrust, M., Das, T., Sun, L., Yavuz, B., Zhu, S., Murthy, M., Torres, J., Van Hovell, H., Ionescu, A., Luszczak, A., et al. "Delta Lake: high-performance acid table storage over cloud object stores". Proceedings of the VLDB Endowment 13, 12 (2020), pp. 3411-3424.

Armbrust, M., Ghodsi, A., Xin, R., and Zaharia, M. "Lakehouse: A new generation of open platforms that unify data warehousing and advanced analytics". CIDR.

Barbalace, Antonio and Do, Jaeyoung, "Computational Storage: Where Are We Today?", CIDR, 2021,http://cidrdb.org/cidr2021/papers/cidr2021_paper29.pdf.

Dageville, B., Cruanes, T., Zukowski, M., Antonov, V., Avanes, A., Bock, J., Claybaugh, J., Engovatov, D., Hentschel, M., Huang, J., et al. "The Snowflake Elastic Data Warehouse". In SIGMOD (2016).

Do, J., Kee, Yang-Suk., Patel, J. M., Park, C., Park, K., and Dewitt, D. J. "Query Processing on Smart SSDs: Opportunities and Challenges". In SIGMOD (2013).

Hunt, R. "S3 Select and Glacier Select—Retrieving Subsets of Objects". https://aws.amazon.com/blogs/aws/s3-glacier-select, 2018.

Langdale, Geoff and Lemire, Daniel , "Parsing gigabytes of JSON per second", The VLDB Journal, vol. 28, No. 6, p. 941-960, 2019, https://core.ac.uk/download/pdf/227192468.pdf.

Ge, Chang; Li, Yinan; Eilebrecht, Eric; Chandramouli, Badrish; and Kossmann, Donald, "Speculative distributed CSV data parsing for big data analytics", Proceedings of the 2019 International Conference on Management of Data, 883-899, 2019; https://badrish.net/papers/dp-sigmod19.pdf.

Tan, J., Ghanem, T., Perron, M., Yu, X., Stonebraker, M., Dewitt, D., Serafini, M., Aboulnaga, A., and Kraska, T. "Choosing a cloud dbms: architectures and tradeoffs". Proceedings of the VLDB Endowment 12, 12 (2019), 2170-2182.

Weiss, R. "A Technical Overview of the Oracle Exadata Database Machine and Exadata Storage Server". Oracle White Paper. Oracle Corporation, Redwood Shores (2012).

Yu, X., Youill, M., Woicik, M., Ghanem, A., Serafini, M., Aboulnaga, A., and Stonebraker, M. "PushdownDB: Accelerating a DBMS using S3 Computation". In 2020 IEEE 36th International Conference on Data Engineering (ICDE) (2020), IEEE, pp. 1802-1805.

International Search Report and Written Opinion for application No. PCT/US2022/041719, dated Dec. 16, 2022, 16 pages.

* cited by examiner

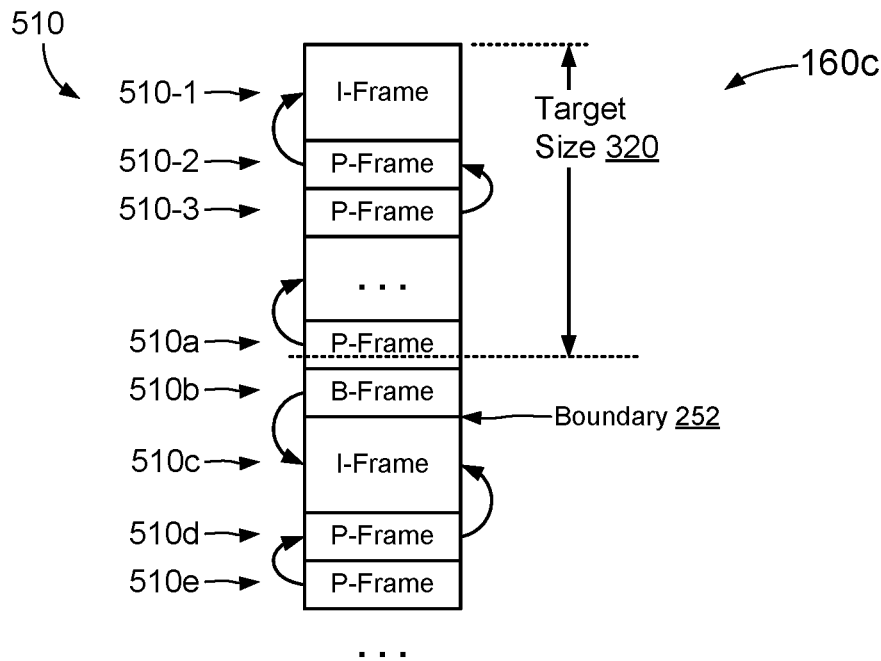
FIG. 5A
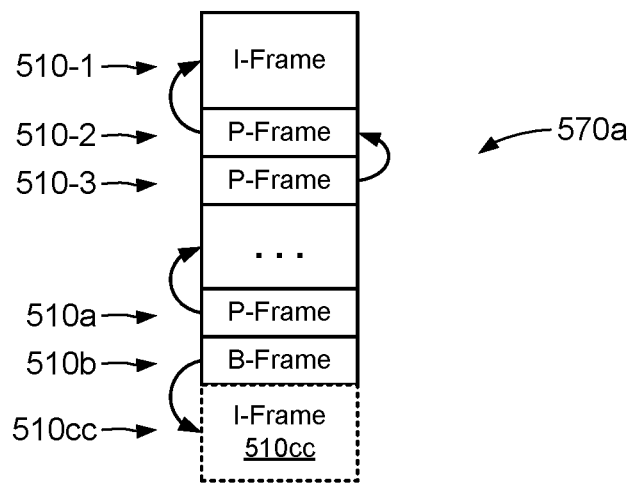
FIG. 5B
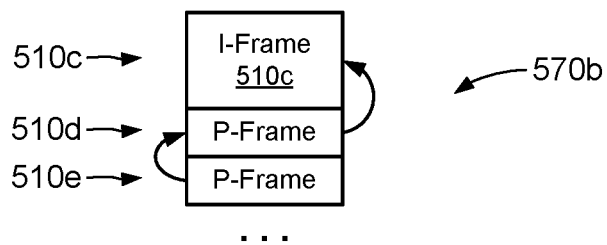

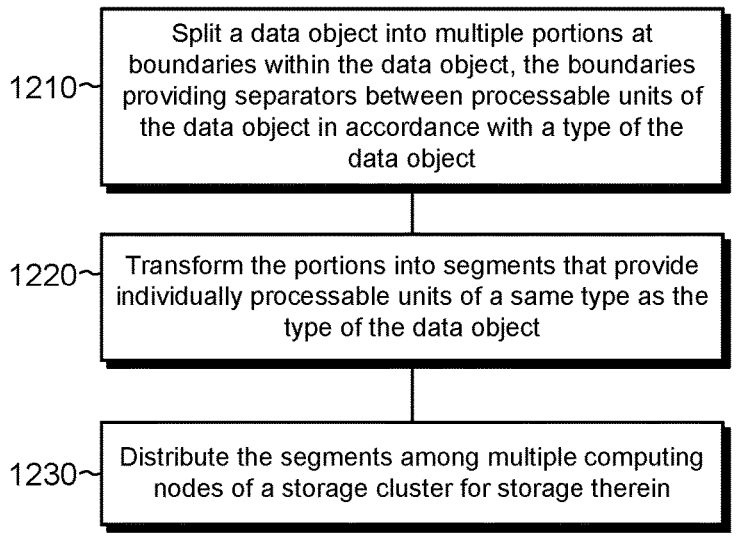
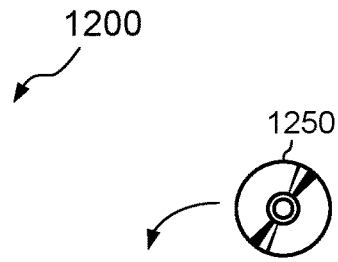
FIG. 12
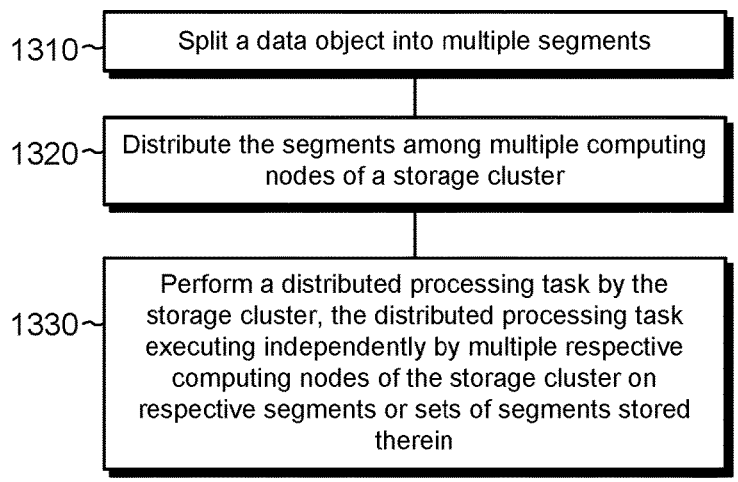
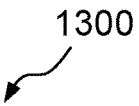
FIG. 13
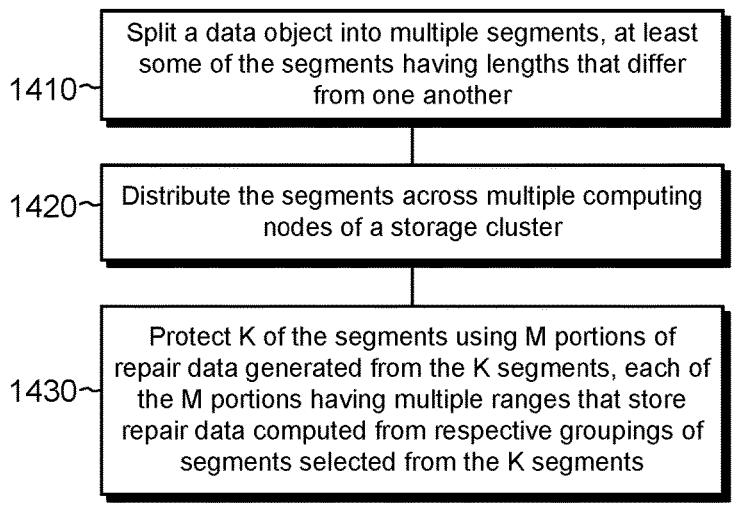
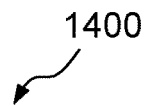
FIG. 14

| Sample to Chunk Box | |
|---|---|
| Property | Value |
| entries | ▽List contents(474) |
| | Entry(firstChunk=1, samplesPerChunk=1, sampleᴅ |
| | Entry(firstChunk=2, samplesPerChunk=3, sampleᴅ |
| | Entry(firstChunk=6, samplesPerChunk=4, sampleᴅ |
| | Entry(firstChunk=7, samplesPerChunk=3, sample |
| | Entry(firstChunk=14, samplesPerChunk=4, sample |
| | Entry(firstChunk=15, samplesPerChunk=3, sample |
| | Entry(firstChunk=22, samplesPerChunk=4, sample |
| flags | |
| parsed | true |
| size | 5704 |
| userType | null |

FIG. 16

| Sample Size Box | |
|---|---|
| Property | Value |
| flags | |
| parsed | true |
| SampleCount | 5904 |
| SampleSize | 0 |
| SampleSizes | ▽Array contents (5904) |
| | 1011 |
| | 1026 |
| | 1030 |
| | 990 |
| | 958 |

FIG. 17

| stco - Chunk Offset Table ||||
|---|---|---|---|
| version 0 | | flags 0x000000 ||
| entry count 10775 ||||
| chunk offset ||||
| 44 | 4220 | 7675 | 12423 |
| 17648 | 28876 | 35094 | 41278 |
| 47353 | 53586 | 61348 | 68235 |
| 76651 | 83169 | 92144 | 104239 |
| 118208 | 132647 | 140417 | 156248 |
| 170227 | 181788 | 198800 | 205125 |
| 218329 | 230077 | 240253 | 244669 |
| 253159 | 260275 | 266948 | 276227 |
| 282396 | 285880 | 291644 | 297514 |
| 302974 | 308216 | 312590 | 317776 |
| 322854 | 327565 | 329367 | 333637 |
| 338913 | 343922 | 349169 | 354836 |
| 358921 | 364283 | 369520 | 374309 |
| 379105 | 382358 | 388181 | 394026 |
| 400060 | 403808 | 409866 | 416123 |
| 422374 | 429014 | 434671 | 437544 |

*FIG. 18*

Partition

~99.9% mp4 ftyp

Free & ...

moov
- track(video)
- track(audio)

mdat
- video data slice #1
- video data slice #2
- audio chunk #1
- video data slice #3
- audio chunk #2
- subtitle data slice #1
- video data slice #4
- . . .

Store moov, ftyp, and free ..., then *ffmpeg*

For the video and subtitle data in mdat atom:
1. no overlap in clips
2. sum(bytes of clips) = bytes of original video/subtitle video clip #n: moov | mdat (video data slice #n) | ftyp | free

Audio clip #n: moov | mdat (audio data slice #n) | ftyp | free

Subtitle clip #n: moov | mdat (subtitle data slice #n) | ftyp | free

*FIG. 19b*

{ "media_type": "video", "stream_index": 0, "key_frame": 0, "pkt_pts": 1933312, "pkt_pts_time": "125.866667", "pkt_dts": 1933312, "pkt_dts_time": "125.866667", "best_effort_timestamp": 1933312, "best_effort_timestamp_time": "125.866667", "pkt_duration": 1024, "pkt_duration_time": "0.066667", "pkt_pos": "10486230", "pkt_size": "3888", "width": 320, "height": 240, "pix_fmt": "yuv420p", "sample_aspect_ratio": "1:1", "pict_type": "p", "coded_picture_number": 1888, "display_picture_number": 0, "interlaced_frame": 0, "top_field_first": 0, "repeat_pict": 0, "chroma_location": "left" }
]
}

FIG. 20a

```
[Parsed_showinfo_0 @ 0x1257066f0] n: 33 pts:2114112 pts_time:88.088  pos: 1256223
fmt:yuv420p sar:1/1 s:1280x720 i:P iskey:1 type:I checksum:EA39E3E5  ..
[Parsed_showinfo_0 @ 0x1257066f0] color_range:tv color_space:bt709
color_primaries:bt709 color_trc:bt709
[Parsed_showinfo_0 @ 0x1257066f0] n: 34 pts:2162160 pts_time:90.09  pos: 12775767
fmt:yuv420p sar:1/1 s:1280x720 i:P iskey:1 type:I checksum:A5C66B7E
[Parsed_showinfo_0 @ 0x1257066f0] side data – User Data Unregistered:
[Parsed_showinfo_0 @ 0x1257066f0] UUID=dc45e9bd-e6d9-48b7-962c-d820d923eeef
[Parsed_showinfo_0 @ 0x1257066f0] UUID=dc45e9bd-e6d9-48b7-962c-d820d923eeef
[Parsed_showinfo_0 @ 0x1257066f0] User Data =
78323634202d20636f7265203135352072323930337364306666323200
```

| #chunk | bytes_offset | bytes_size | track_name | #delta_start | #delta_end | timescale | time range(s) | tgt_file_name | Segment_ID | tgt_bytes_offset | tgt_bytes_size |
|---|---|---|---|---|---|---|---|---|---|---|---|
| 1 | 48 | 906080 | video_0 | 0 | 512 | 15360 | 0.00-0.03 | [video0.mp4] | 0 | [48] | [906080] |
| 2 | 906128 | 428 | audio_1 | 0 | 1000 | 44100 | 0.00-0.02 | audio_1.mp4 | 1 | 44 | 428 |
| 3 | 906556 | 562 | audio_2 | 0 | 1024 | 44100 | 0.00-0.02 | audio_2.mp4 | 2 | 44 | 562 |
| 4 | 907118 | 406 | audio_3 | 0 | 1000 | 44100 | 0.00-0.02 | audio_3.mp4 | 3 | 44 | 406 |
| 5 | 907524 | 572 | audio_1 | 1000 | 2000 | 44100 | 0.02-0.05 | audio_1.mp4 | 1 | 472 | 572 |
| 6 | 908096 | 416 | audio_3 | 1000 | 2000 | 44100 | 0.02-0.05 | audio_3.mp4 | 3 | 450 | 416 |
| 7 | 908512 | 604 | audio_2 | 1024 | 2048 | 44100 | 0.02-0.05 | audio_2.mp4 | 2 | 606 | 604 |
| 8 | 909116 | 1504 | video_0 | 512 | 1024 | 15360 | 0.03-0.07 | [video0.mp4] | 0 | [906128] | [1504] |
| 9 | 910620 | 416 | audio_1 | 2000 | 3000 | 44100 | 0.05-0.07 | audio_1.mp4 | 1 | 1044 | 416 |
| 10 | 911036 | 418 | audio_3 | 2000 | 3000 | 44100 | 0.05-0.07 | audio_3.mp4 | 3 | 866 | 418 |

*FIG. 21*

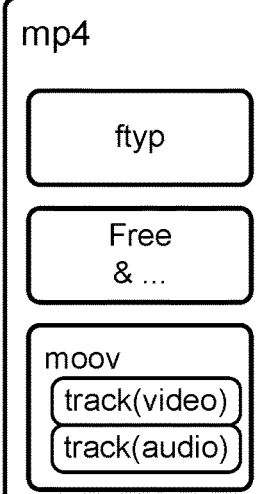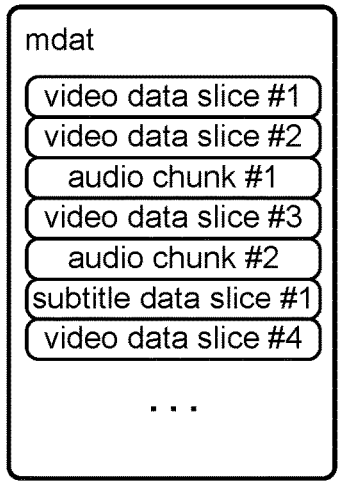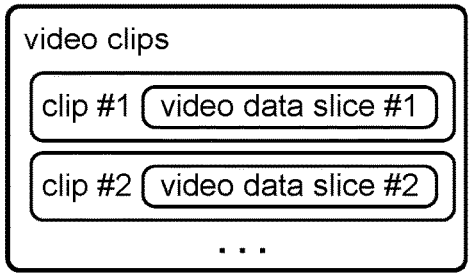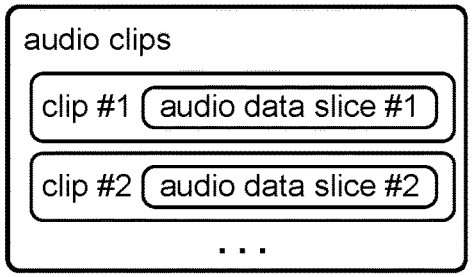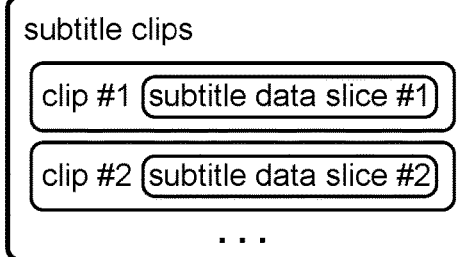
FIG. 22b

```
> src
∨ test_video
  ∨ three_audio
    > clips
    ∨ other_streams
       ⊙ audio_1.mp4
       ⊙ audio_2.mp4
       ⊙ audio_3.mp4
    ≡ logfile.txt
    ≡ three_audio.meta
  ⊙ sample-mp4-file.mp4
  ⊙ tennis_15min.mp4
  ⊙ three_audio.mp4
  ⓘ README.md
```

*FIG. 23a*

```
> src
∨ test_video
  ∨ three_audio
    > clips
    ∨ other_streams
    ≡ logfile.txt
    ⊙ three_audio_recon.mp4
    ≡ three_audio.meta
  ⊙ sample-mp4-file.mp4
  ⊙ tennis_15min.mp4
  ⊙ three_audio.mp4
  ⓘ README.md
```

*FIG. 23b*

PARTITIONING, PROCESSING, AND PROTECTING MEDIA DATA

CROSS-REFERENCE TO RELATED APPLICATIONS

This application claims the benefit of U.S. Provisional Application No. 63/237,766, the contents and teachings of which are incorporated herein by reference in their entirety.

BACKGROUND

Data processing and protection have undergone transformational change with the increased availability of inexpensive processors and storage media. Users now have the option to process and store their data locally, or to store their data on servers connected over a network, in computing clusters, or in the cloud. In addition, cloud computing options include both public cloud and private cloud offerings.

With the era of big data upon us, users wish to store and process ever more voluminous data objects. For example, it is not uncommon for tabular data, tree-based data, and audio and/or video data to reach sizes in the gigabyte range or above. Processing, protecting, and storing such large data objects presents unique challenges.

A common approach is to divide a large object into separate portions and to store the portions on respective computers. Programs may divide an object by identifying byte boundaries in the object and producing portions of equal size, or nearly so. To perform data processing on a data object once it has been stored in a distributed manner, a computer may gather particular portions or groups of portions of the original object, perform desired processing tasks on the gathered portions, and generate results.

SUMMARY

Unfortunately, the above-described distributed approach can be inefficient. For example, the practice of dividing large data objects into equal or nearly equal portions can ignore structural features and can introduce dependencies between or among different data portions. As a simple example, consider a data object containing many rows of tabular data. Dividing the object to form equal-sized portions may mean cutting off a row in the middle. Any subsequent query that involves access to the cut-off row may thus require access to two portions of the data object, one that stores the beginning of the row and one that stores the end. The two portions may typically be stored on different computers on a network.

Continuing with the above example, it may further be necessary to transfer both portions (containing both parts of the cut-off row) back to the requester or to some other node, where the portions are reassembled and a query is performed. These acts introduce large inefficiencies as they involve large copies of data over the network.

In addition to the above, the prior approach may be oblivious to content. For example, a split-off portion of a data object may lose its association with the data object as a whole. Field names may be missing for tabular data (e.g., if only row data are stored). Extracting meaningful data from a distributed object may thus involve directing many network accesses to different computers, in an effort to collect all the pieces needed to complete a desired processing task. What is needed is a more efficient way of handling large data objects.

To address this need at least in part, a technique for managing data objects in a storage cluster includes splitting a data object into multiple portions at boundaries within the data object. The technique further includes transforming the portions of the data object into segments that provide individually processable units, and distributing the segments among multiple computing nodes of the storage cluster for storage therein.

Advantageously, providing segments as individually-processable units means that the workload associated with performing a processing task on the data object can be pushed down efficiently to the computing nodes that store the segments of the data object locally. The technique thus enables true parallel processing, with each computing node performing the processing task on only the segment or segments of the data object stored therein. It also greatly reduces network traffic as compared with prior schemes. For example, high-speed connections of computing nodes to their local storage greatly enhances overall efficiency. Further, the independent nature of segments means that little or no communication is required among computing nodes (e.g., to resolve dependencies) in order to complete a processing task.

The above-described technique may be applied to media data, which can benefit greatly from distributed storage and parallel computing. Accordingly, an improved technique for managing data objects in a storage cluster includes splitting a media data object into multiple portions at boundaries within the media data object. The technique further includes transforming the portions of the media data object into segments that provide individually processable units and distributing the segments among multiple computing nodes of the storage cluster for storage therein.

Certain embodiments are directed to a method of managing media data. The method includes splitting a media data object into multiple portions at boundaries within the media data object, transforming the portions into segments that provide individually processable units of media data, and distributing the segments among multiple computing nodes of a storage cluster for storage therein.

In some examples, splitting the media data object into portions includes defining multiple portions that contain video data corresponding to respective intervals of time.

In some examples, the defined portions that contain video data contain no audio data.

In some examples, splitting the media data object into portions further includes providing at least one portion that contains audio data but no video data.

In some examples, splitting the media data object into portions further includes defining multiple portions that contain audio data corresponding to respective intervals of time but contain no video data.

In some examples, the media data object includes audio data for multiple audio tracks, and each of the portions that contain audio data includes audio data for all of the multiple audio tracks for the respective interval of time.

In some examples, splitting the media data object into portions further includes providing at least one portion that contains subtitle data.

In some examples, splitting the media data object includes providing an overlap region between two consecutive segments of a same type, the type being one of video, audio, or subtitle, such that the two consecutive segments contain respective regions having identical data.

Some examples further include defining a size of the overlap region based on at least one of (i) a specified duration of time and (ii) a specified number of frames.

In some examples, the media data object includes video data having a frame rate, and defining the size of the overlap region is based on a longer of (i) the specified duration of time and (ii) the specified number of frames.

In some examples, the size of the overlap regions is a user-definable setting.

In some examples, splitting the media data object into portions at boundaries within the media data object includes: identifying a first IDR (Instantaneous Decoder Refresh) frame at a first location in video data of the media data object; identifying a second IDR frame at a second location in the video data, the second IDR frame corresponding to a later point in time than the first IDR frame; ending a first portion of the media data object at the second location; and beginning a second portion of the media data object at the first location, the first portion and the second portion thereby defining the overlapping region, which extends between the first location and the second location.

In some examples, the video data of the media data object includes at least one intervening IDR frame between the first IDR frame and the second IDR frame.

In some examples, transforming the portions into segments includes rendering the portions as standalone, playable media content.

Some examples further include storing an AI (artificial intelligence) filter, configured to process one or more of the segments, among the computing nodes of the storage cluster.

Some examples further include executing the AI filter on a single segment without reference to any other segments.

In some examples, the AI filter includes a neural network configured to identify a specified class of objects or behavior.

In some examples, rendering the portions as standalone, playable media content includes creating respective containers for the portions, the containers including metadata based on respective contents of the media data object.

In some examples, the media data object includes multiple chunks, each chunk including contiguous, time-ordered data for one of (i) video data, (ii) audio data, or (iii) subtitle data, and the method further includes storing a metadata index that associates chunks with respective byte ranges within the media data object, the metadata index thereby enabling access to chunks based on byte range.

In some examples, the media data object includes multiple chunks, each chunk including contiguous, time-ordered data for one of (i) video data, (ii) audio data, or (iii) subtitle data, and the method further includes storing a metadata index that associates chunks with respective time ranges within the media data object, the metadata index thereby enabling access to chunks based on time range.

Some examples further include reconstructing the media data object from the distributed segments.

Additional embodiments are directed to a computerized apparatus constructed and arranged to perform a method of managing media data, such as any of the methods described above. Still other embodiments are directed to a computer program product. The computer program product stores instructions which, when executed on control circuitry of a computerized apparatus, cause the computerized apparatus to perform a method of managing media data, such as any of the methods described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

FIGS. 5A and 5B are block diagrams that show an example arrangement for splitting a data object that contains video data.

FIG. 12 is a flowchart showing an example method of managing data objects in accordance with one embodiment.

FIG. 13 is a flowchart showing an example method of managing data objects in accordance with another embodiment.

FIG. 14 is a flowchart showing an example method of managing data objects in accordance with yet another embodiment.

FIG. 16 is a screenshot showing an example display of samples per chunk.

FIG. 17 is a screenshot showing an example display of sample sizes.

FIG. 18 is a screenshot showing an example display of a chunk offset table.

FIGS. 19a and 19b are block diagrams showing respective example processes for partitioning a media file.

FIGS. 20a and 20b are example computer listings of per-frame metadata.

FIG. 21 is a tabular display of example metadata values formed by extracting and analyzing the metadata of a media file.

FIGS. 22a and 22b are block diagrams showing respective example processes for reconstructing a media file.

FIGS. 23a and 23b are respective displays, according to a first example, of directory structures after partitioning a media file (FIG. 23a) and after reconstructing the media file (FIG. 23b).

DETAILED DESCRIPTION

Embodiments of the improved technique will now be described. One should appreciate that such embodiments are provided by way of example to illustrate certain features and principles but are not intended to be limiting.

A technique for managing data objects in a storage cluster includes splitting a data object into multiple portions at boundaries within the data object. The technique further includes transforming the portions of the data object into segments that provide individually processable units, and distributing the segments among multiple computing nodes of the storage cluster for storage therein.

In the following description:
 Section I presents an example environment as well as embodiments directed to partitioning, processing, and protecting data.
 Section II presents example applications of the Section-I embodiments to media data.

Section I: Partitioning, Processing, and Protecting Data

This section discloses multiple embodiments. One embodiment is directed to splitting a data object into portions for distributed storage in the storage cluster. Another embodiment is directed to performing a distributed processing task by the storage cluster. Yet another embodiment is directed to protecting data of a data object stored in a storage cluster. These embodiments may be realized as respective aspects of a single system, as shown and described in the examples that follow. Alternatively, embodiments may be practiced independently, such that an implementation supporting any one of the embodiments need not also support the other embodiments.

Figure 1:
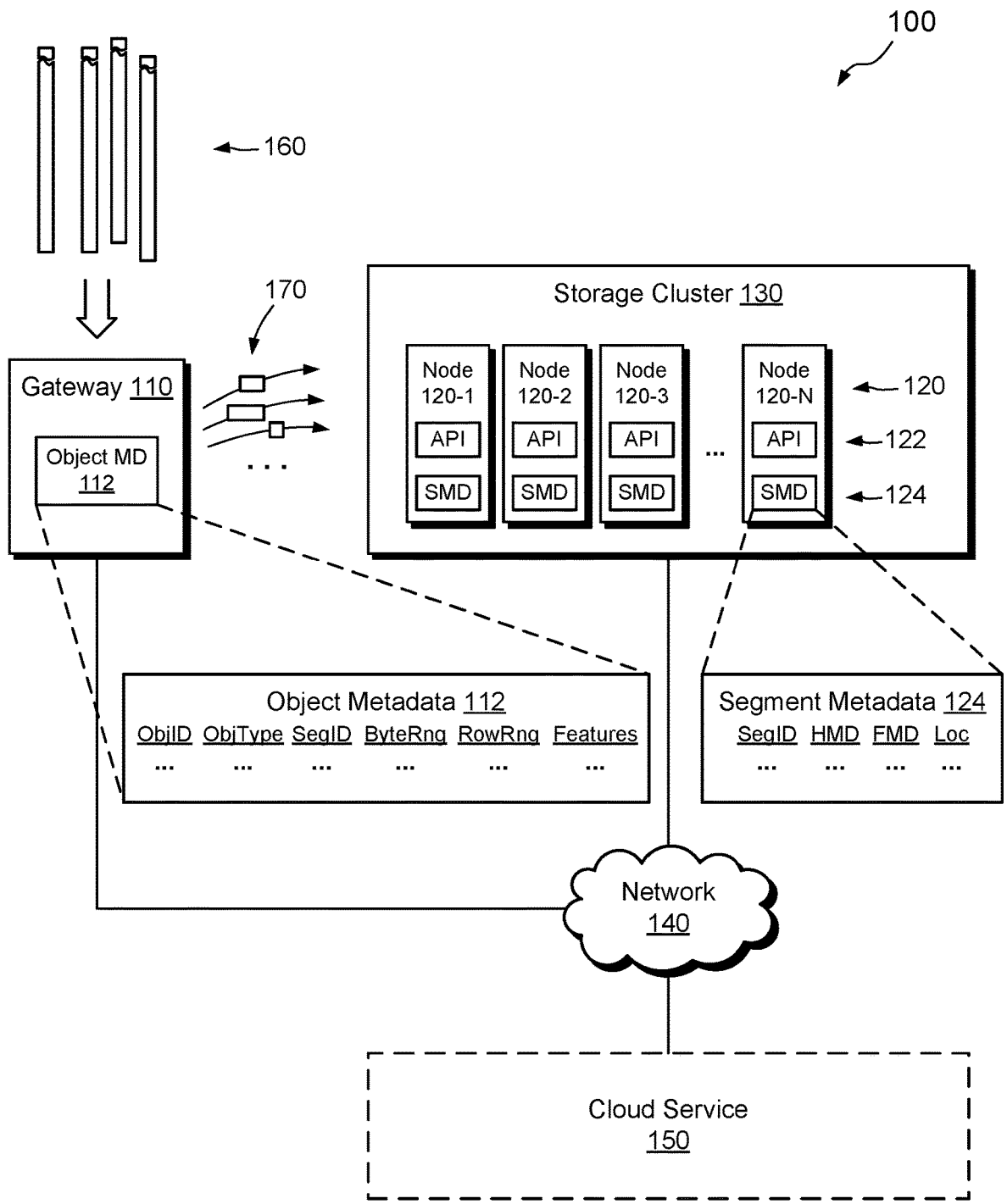
FIG. 1 is a block diagram of an example environment in which embodiments of the improved technique can be practiced.

FIG. 1 shows an example environment 100 in which embodiments of the improved technique can be practiced. As shown, a gateway 110 is configured to access multiple computing nodes 120 of a storage cluster 130 over a network 140 and to act as an interface between the storage cluster 130 and clients/users. The network 140 may include a local area network (LAN), a wide area network (WAN), the Internet, or any other type of network or combination of networks that supports digital communication between computers. The gateway 110 may be a computer or other computing device (e.g., server, workstation, tablet, smartphone, personal data assistant, gaming console, set-top box, or the like), which may include its own network interface, processor, and memory. In some examples, the gateway 110 may be provided as a computing node 120 of the storage cluster 130. Multiple computing nodes 120 (also referred to herein as "nodes") 120-1 through 120-N are shown, with the understanding that the storage cluster 130 may include a large number of nodes 120, such as hundreds or more. Each node 120 includes one or more processors and memory for running programs, as well as one or more network interfaces (e.g., network interface cards) and persistent storage, such as one or more solid-state drives (SSDs), magnetic disk drives, and/or the like. Nodes 120 of the storage cluster 130 may be interconnected via the network 140, or via a dedicated network (e.g., a separate local area network; not shown), or by other means. For purposes of this document, any network internal to the storage cluster 130 is considered herein to be part of the network 140.

Preferably, each node 120 has one or more high-speed connections to its respective persistent storage. For example, connections between nodes 120 and their storage devices (e.g., SSDs) may have bandwidths that exceed those of connections between nodes over network 140 by an order of magnitude or more.

In an example, the storage cluster 130 is configured as an object store, which may be compatible with commercially available cloud-based object stores, such as AWS (Amazon Web Services) S3 (Simple Storage Service), Microsoft Azure Data Lake, and/or Google Cloud Storage. In a particular example, the storage cluster 130 is configured as an S3-compatible object store. To this end, each node 120 may include an API (application program interface) 122 that enables the node 120 to participate as a member of the object store. The cluster 130 may be implemented in a data center, which may occupy a room or multiple rooms of a building, in which the nodes 120 are networked together. Other implementations may span multiple buildings, and metro-cluster arrangements are feasible.

In other examples, the storage cluster 130 may be implemented within a cloud service 150, e.g., using physical or virtual machines provided therein. For instance, the entire storage cluster 130 may be disposed entirely within the cloud service 150.

As yet another example, the cloud service 150 may act as a primary repository of data, with the storage cluster 130 acting as a cache for the cloud service 150. The storage cluster 130 may thus store commonly accessed data but typically not all data available from the cloud service 150.

Implementations may be suitable for individuals, small organizations, and/or enterprises, and may be delivered according to a SaaS (software as a service) model or according to other models. Embodiments are particularly suitable for managing large data objects, which may have sizes in the hundred-megabyte range or above. This feature makes embodiments a good match for big data applications, such as those involving data lakes. One should appreciate, though, that embodiments are not limited to any particular users, service model, data size, or application.

In example operation, gateway 110 (which may be part of the storage cluster 130 or separate therefrom) accesses one or more data objects 160 to be managed by the storage cluster 130. The data objects 160 may reside in the cloud service 150, e.g., within buckets or blobs, or they may be provided by one or more separate sources. For example, data objects 160 may be generated by real-time activities, such as industrial or scientific processes which may produce the data objects 160 as data logs or other records of ongoing activities. The data objects 160 may be presented as files, streams, memory ranges, or in any other manner.

The data objects 160 may be structured in accordance with particular object types. For example, data objects 160 may be provided as tabular objects such as CSV (comma-separated values) or log files, as tree-based objects such as JSON (JavaScript Object Notation) or XML (extensible markup language) documents, as column-oriented objects such as Apache Parquet files, as video files or streams, as audio files or streams, or as collections of pictures, for example. Although certain types of data are particularly shown and/or described, one should appreciate that embodiments are intended to encompass any type of data, with the ones shown and/or described merely providing concrete examples used to illustrate operating principles.

To initiate management of a data object 160, gateway 110 may scan the data object, e.g., starting from the beginning of the data object and proceeding forward. Normally, the gateway 110 may be oblivious to the data object's type when it first accesses the object and may perform an initial scan of the object 160 to identify its type. The scan may involve sampling a set of regions of the data object, typically at the beginning of the object, and searching for sequences or characters that are specific to particular object types. For instance, CSV and log files typically use NewLine characters to denote ends of records, and may use commas, spaces, or other characters to separate adjacent fields. Some data objects may include headers that directly identify the type of object. For example, Parquet files start with a 4-byte header that designates a so-called "magic number," which provides the code "PAR1" to identify the file as a Parquet file. Most file types provide clear indications that enable them to be identified without much effort. Some types may be harder to identify. Should one wish to recognize such less-easily identifiable types, more advanced algorithms may be applied, which may include machine learning or other types of artificial intelligence.

Once the gateway 110 has identified the type of the data object 160, the gateway 110 may proceed to start splitting the data object 160 into portions. For example, gateway 110 may search for boundaries in the data object that provide separators between adjacent processable units of the data object. The exact nature of the boundaries may vary from one object type to another. For example, CSV files may use NewLine characters to identify boundaries, whereas video files or streams may use I-frames (intra-coded pictures). Some object types specify boundaries using embedded metadata. For instance, Parquet files contain footers that identify boundaries between adjacent row groups.

The "processable units" of a data object are regions which are amenable to independent processing, in the sense that they contain few if any dependencies on other processable units. Splitting a data object into processable units thus promotes efficient parallel processing by nodes 120 of the storage cluster 130.

Although splitting is a first step in promoting independent processing of split-off portions, it is not always sufficient for optimal performance. For example, split-off portions may lack certain metadata (e.g., headers, footers, or other content) that cause them to retain dependencies on other parts of the data object 160. Thus, the gateway 110 preferably performs an additional step of transforming the split-off portions into segments 170. In an example, the transformed segments 170 can be processed as if they were complete, self-contained objects of the same type as the data object 160.

The segments 170 are similar to the portions from which they were created, but they are adjusted to reduce or eliminate dependencies on other portions. For example, if the first portion of a CSV file contains a header but subsequent portions do not, then the gateway 110 may copy the header of the first portion to each of the segments 170 that are formed from the subsequent portions. In this manner, each segment 170 has its own header and can be processed as if it were an independent CSV file. Corresponding adjustments may be performed for other object types, with the particulars of the adjustments depending on the object type. Various examples are provided below.

With the segments 170 thus formed as independently-processable units of the same type as the data object 160, gateway 110 may distribute the segments 170 to various nodes 120 of the storage cluster 130, which nodes 120 store the segments therein, e.g., in persistent storage locally connected to the respective nodes 120. To keep track of segment locations, gateway 110 may update object metadata 112.

As shown in an expanded view of FIG. 1, object metadata 112 includes object-specific information that facilitates operation of the storage cluster 130. Such object metadata 112 may include the following elements, for example:

ObjID. An object identifier, which is preferably unique within a namespace of the storage cluster 130.

ObjType. A determined type of the data object 160, such as CSV, JSON, XML, Parquet, etc.

SegID. An identifier of a segment 170 created from a portion of the object. Preferably unique within the namespace of the storage cluster 130.

ByteRng. A range of bytes of the data object 160 included in the current segment. May be expressed as a value-pair that specifies a start byte position and an end byte position (or as a start byte position and a length).

RowRng. A range of rows of the data object 160 included in the current segment. Relevant to tabular data and other types of data provided in rows.

Features. Features detected in segments that may be relevant to later processing. May be provided on a per-segment basis.

Although shown as a single-level structure, object metadata 112 may be arranged in any suitable manner, which may include a hierarchical structure. Also, the scope of object metadata 112 is not limited to the examples provided. Indeed, object metadata 112 may store any information that facilitates operation of the storage cluster 130 or processing tasks that may be performed therein.

In some examples, object metadata 112 is stored redundantly to promote reliability. For instance, object metadata 112 may be stored on multiple nodes 120 of the storage cluster 130, e.g., using a multi-way mirror and/or other RAID (Redundant Array of Independent Disks) or erasure-coding techniques. Also, activities attributed herein to the gateway 110 may be performed by any number of computers, and such computers may include nodes 120 of the storage cluster 130. For example, a particular node of the storage cluster 130 may be designated as a load balancer and may take the workload of nodes 120 into account when segments 170 are distributed among nodes of the cluster.

As still further shown in FIG. 1, computing nodes 120 may store segment metadata 124, which describes the segments 170 stored by the respective nodes 120. Examples of segment metadata 124 may include the following elements:

SegID. The unique identifier of a segment stored on the computing node 120.

HMD. Header metadata that forms part of the segment stored on the computing node 120. May be a copy of header metadata, originally found in another segment derived from the same object, which is included with the current segment to promote independent processing of the current segment.

FMD. Footer metadata that forms part of the segment stored on the computing node 120. May be a copy of footer metadata, originally found in another segment derived from the same object, which is included with the current segment to promote independent processing of the current segment.

Loc. A location at which the node 120 may access the current segment. Expressed in any suitable manner, such as by disk drive and logical block address (LBA), as a volume, as a file, as an aggregate, or in any other manner used by the node 120 in addressing its data.

As with object metadata 112, segment metadata 124 may also be stored redundantly to promote reliability. In some examples, nodes 120 may store segment metadata 124 along with the segments 170 that the metadata describe. For example, segment metadata for segment A may be stored with Segment A. Likewise, segment metadata for segment B may be stored with Segment B. Segment metadata 124 may then be protected in the same ways that the segments 170 themselves are protected. Various examples of segment protection are described hereinbelow.

Figure 2:
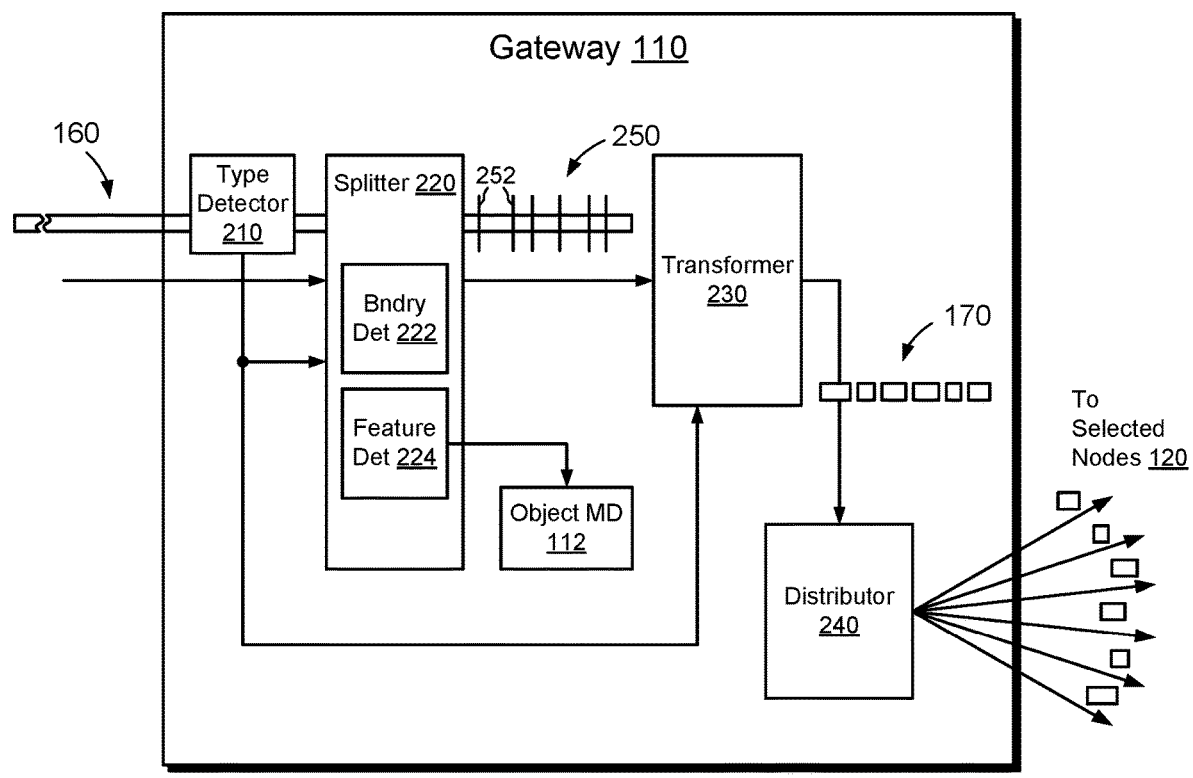
FIG. 2 is a block diagram that shows example features of a gateway device of FIG. 1 in additional detail.

FIG. 2 shows example features of the gateway 110 in additional detail. For this example, it is assumed that the gateway 110 performs the indicated functions itself. As stated previously, some of the functions may be performed by other computers, including computing nodes 120 of the cluster 130.

As shown, the gateway 110 includes a type detector 210, a splitter 220, a transformer 230, and a distributer 240. The type detector 210 performs the function of reading a set of regions of a data object 160, e.g., by sampling bytes at the beginning of the object, and identifying the object type of the data object 160 based on the sampling. The type detector 210 may inform the splitter 220 and the transformer 230 of the determined object type.

Splitter 220 performs the function of splitting the data object 160 into portions 250. The portions 250 include respective processable units of the data object 160 and are defined by boundaries 252 in the data object. A boundary detector 222 of the splitter 220 scans the data object 160 for boundaries 252, i.e., separators between the processable units, and notes the locations of the boundaries 252 relative to the data object 160 (e.g., based on byte locations). As mentioned earlier, the nature of the boundaries 252 depends upon the object type of the data object 160, which is preferably known based on operation of the type detector 210.

In some examples, such as when splitting Parquet files, the boundary detector 222 may identify every boundary 252 in the data object 160 and define a new portion 250 between each pair of boundaries. Detecting every boundary works well for Parquet files, where boundaries 252 are based on row groups, which tend to be large (e.g., in the megabyte range). If a row group is found to be unusually small, however, then a boundary may be skipped, such that multiple row groups may be included within a single portion 250. In other examples, such as when splitting CSV files, boundary detector 222 does not mark every single boundary of the data object 160, as doing so would produce an undesirably large number of small portions 250. In such cases, boundary detector 222 may wait to start detecting boundaries 252 when scanning a current portion 250 until the scanned size of the portion 250 exceeds some desired target size. Once the scan passes the target size, the boundary detector 222 may start detecting boundaries, preferably identifying the first boundary that the object contains beyond the target size. The current portion may thus end and a new portion may begin at the first detected boundary.

As the boundary detector 222 scans the object 160 for boundaries 252, a feature detector 224 may scan the object for additional features that may provide helpful information relevant to later processing. It is recognized that certain processing tasks run faster if it is known in advance that certain content is present or absent. As a particular example, certain queries of CSV files run more quickly if it is known in advance that there are no quotation marks in the data. Feature detector 224 may thus check CSV files for the presence or absence of quotation marks and update the object metadata 112 ("Features") accordingly.

With portions 250 of the data object 160 identified based on boundaries 252, transformer 230 transforms the portions 250 into respective segments 170. For example, transformer 230 modifies at least some of the portions 250 by adding metadata found in some portions to one or more other portions, so as to make such portions more amenable to independent processing, i.e., by removing dependencies between portions 250. The nature of the adjustments depends on the object type, which is known based on operation of the type detector 210. The results of operation of transformer 230 are segments 170, which provide individually processable units of the data object. For example, each of the segments 170 is rendered as the same object type as the data object 160. The segments 170 can thus be processed the same way that data objects can be processed, with the primary difference being that segments 170 are much smaller and more easily handled.

Distributor 240 then distributes the segments 170 to selected nodes 120 of the storage cluster 130 for storage in such nodes. At this time, gateway 110 updates object metadata 112 to record the locations to which the segments 170 are sent, e.g., the identities of particular nodes 120. In the manner described, the data object 160 is thus split, transformed, and distributed among nodes 120 of the storage cluster 130.

Figure 3A:
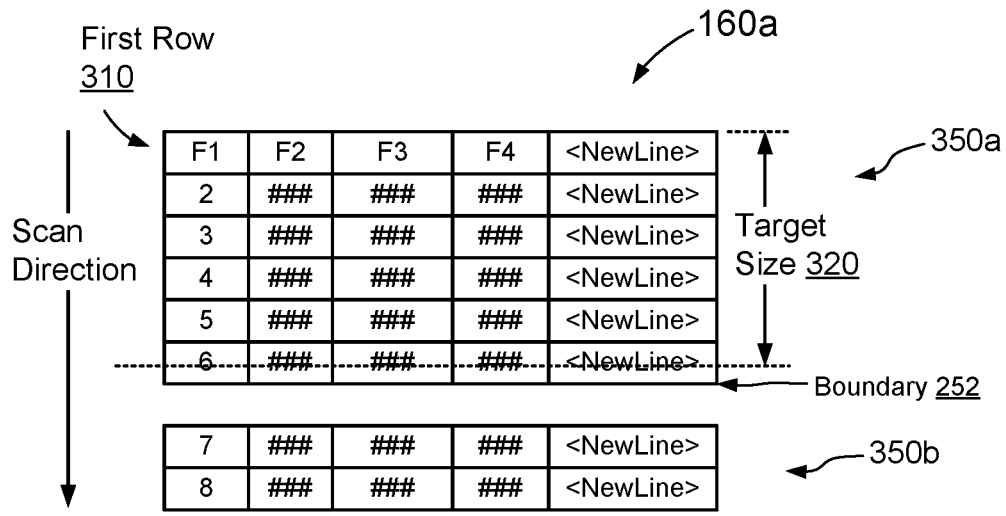
FIGS. 3A and 3B are block diagrams that show an example arrangement for splitting a data object that contains tabular data.
Figure 3B:
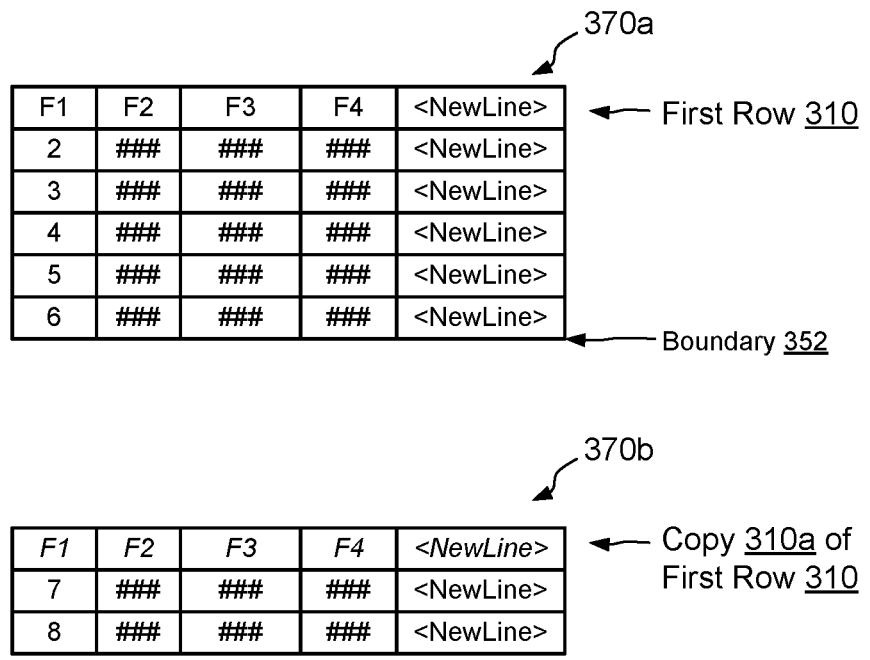

FIGS. 3A and 3B show an example arrangement for splitting and transforming a data object 160a that contains tabular data, such as a CSV file. FIG. 3A shows example results of splitting, and FIG. 3B shows example results of transforming.

As shown in FIG. 3A, the data object 160a has a first row 310 and additional rows, labeled 2 through 8 (see column 1). The data object 160a has four columns. Each row ends in a <NewLine> character, which acts as row delimiter in CSV.

When splitting the data object 160a, the splitter 220 may apply a target size 320, which defines a minimum size for portions 350 of the data object 160a. For example, the splitter 220 may identify a location (shown as a dotted line) along the data object 160a that corresponds to the target size 320, and then split the data object 160a at the first boundary that follows the identified location. In the example shown, the splitter 220 detects the NewLine character at the end of the sixth row as a first boundary 252 following the target size 320, and splits the object 160a at this location. As a result, the first six rows of object 160a form a first portion 350a, and the next two rows form the first two rows of a second portion 350b. Additional rows may be added to the second portion 350b as the splitter 220 continues to scan the object 160a.

Even though the splitter 220 has successfully separated the object 160a at a row boundary (thus avoiding having different parts of the same row assigned to different portions 350), the result of splitting may still be inefficient. For example, if the first row 310 of object 160a is a header row (e.g., a row that contains text indicating column names), then the second portion 350b would lack that header and its later processing might be compromised. For example, the header may be required for responding to certain queries or other activities. This deficiency may be addressed by transformer 230, however.

FIG. 3B shows example results of modifications made by transformer 230. Here, the portions 350a and 350b are now rendered as segments 370a and 370b, respectively. Segment 370b has been modified by insertion of a first row 310a, which is a copy of the first row 310 found in the first segment 370a. The addition of the first row 310a effectively transforms the second portion 370b into an independent processable unit. One should appreciate that the change made in segment 370b may be repeated in other segments 370 created for object 160a, such that all segments 370 are made to have the same first row 310 as that of the first segment 370a. All such segments 370 are thus made to be independently processable.

It is noted that some CSV files do not use header rows, such that the first row 310 may contain data, rather than text-based field names. In such cases, replication of the first row 310 of the first segment 370a to other segments 370 of object 160a may merely propagate redundant data. Such cases can be handled easily, however. For instance, queries or other processing tasks (e.g., arriving from clients of the storage cluster) may specify whether the CSV file represented by object 160a contains a header. If it does, then no change needs to be made, as copying the header was proper. But if the task specifies that the CSV file contains no header, then the copying turns out to have been unnecessary. In such cases, the nodes 120 that perform the distributed processing task on the CSV file may be directed simply to ignore the first row of all but the first segment 370a of segments 370. Little will have been lost as a result of copying the first row 310, which is typically negligible in size compared with that of a segment 370.

Figure 4A:
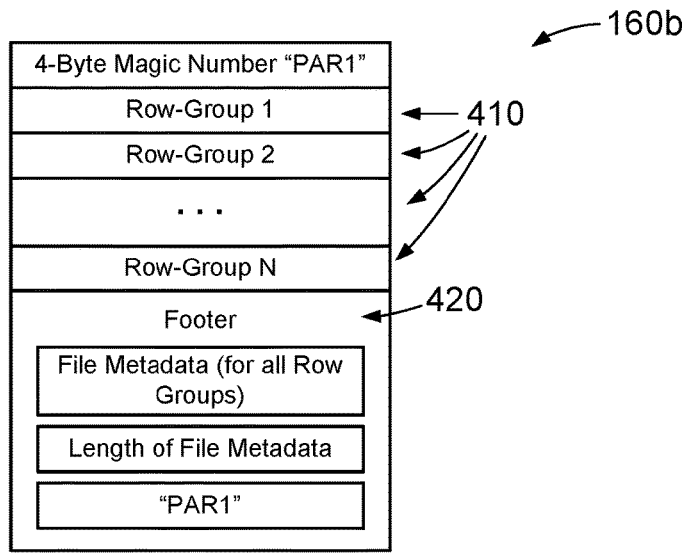
FIGS. 4A and 4B are block diagrams that show an example arrangement for splitting a data object that contains a Parquet file.
Figure 4B:
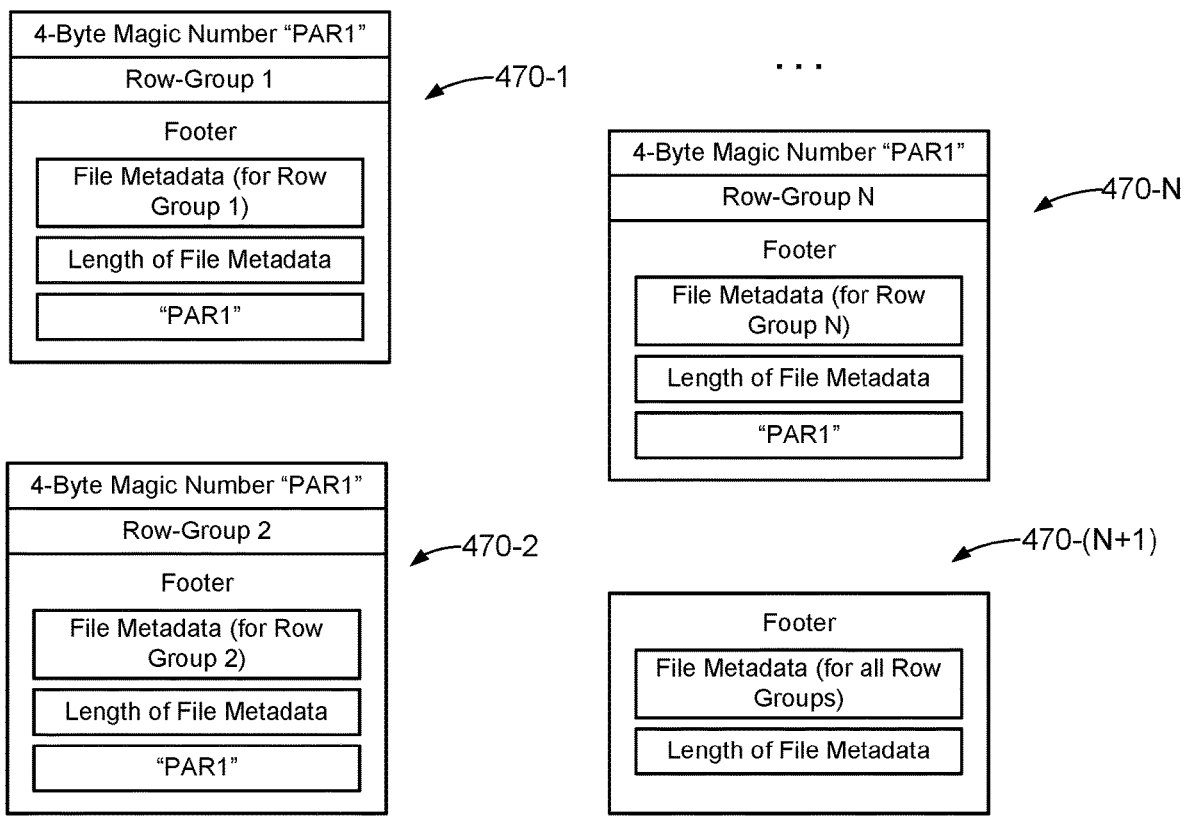

FIGS. 4A and 4B show an example arrangement for splitting and transforming a data object 160b that contains column-based data, such as a Parquet file. FIG. 4A shows an example Parquet file structure prior to splitting and transforming, and FIG. 4B shows example results after splitting and transforming.

As seen in FIG. 4A, the Parquet file 160b starts and ends with a 4-byte "Magic Number" ("PAR1"), as described above. The file 160b further includes multiple row groups 410 (1 through N, where "N" is any positive integer), and a footer 420. The row groups 410 are large structures, typically on the order of megabytes each. The footer 420 contains file metadata, which includes row-group metadata that provides locations of the row groups 410 (e.g., byte locations) within the file 160b. The footer 420 also includes a 4-byte data element that encodes the "Length of File Metadata."

Unlike the CSV example, where boundaries 252 may be detected directly while scanning forward through an object, boundaries between row groups 410 can be detected easily only by reading the footer 420. This means that splitter 220 typically makes a pass through the entire file 160a before reaching the footer 420, and then splits retrospectively. Splitting is generally performed at every row-group boundary, such that each portion 260 of the Parquet file 160b is made to contain a single row group 410. Given that row groups 410 may vary in size based on content, it may occasionally be worthwhile to place two or more row groups 410 into a single portion 260. This is a matter of design preference.

As shown in FIG. 4B, the Parquet file 160b of FIG. 4A has been rendered as N different segments 470 (470-1 through 470-N), with each segment containing a single row group. For example, segment 470-1 contains Row-Group 1, segment 470-2 contains Row-Group 2, and so on, up to segment 470-N, which contains Row-Group N.

The modifications shown in FIG. 4B, which may be implemented by transformer 230, render each row group as a self-contained Parquet file. For example, each of the segments 470-1 through 470-N contains the magic number "PAR1" at the beginning and at the end. Also, each of the segments 470-1 through 470-N contains a modified footer, which may be a modified version of footer 420. The footer in each segment 470 is prepared so that its row-group metadata is limited to only the row group (or row groups) contained in that segment, and to exclude row-group metadata for any row groups not contained in that segment. In addition, a "Length of File Metadata" is provided for each segment to reflect the actual length of the file metadata in the respective segment. Each segment 470-1 through 470-N thus presents itself as a complete Parquet file, which is amenable to independent processing just as any Parquet file would be.

In some examples, an additional segment 470-(N+1) may be provided as a final segment of the Parquet file 160b. Segment 470-(N+1) contains no row groups but rather provides a persisted version of parts of the original footer 420 of file 160b, i.e., the "File Metadata (for all Row Groups)" and the "Length of File Metadata." This segment is provided for reference and may be useful for speeding up certain processing tasks, but it is not intended to be treated as a self-contained Parquet file. Nor is it intended to be used as a source of data when performing queries.

FIGS. 5A and 5B show an example arrangement for splitting and transforming a data object 160c that contains video data, such as a video file or stream. FIG. 5A shows an example sequence of video frames prior to splitting and transforming, and FIG. 5B shows example results after splitting and transforming.

As seen in FIG. 5A, the data object 160c includes a sequence of frames 510, which in the depicted example include one or more I-frames (e.g., 510-1 and 510c), one or more P-frames (e.g., 510-2, 510-3, 510a, 510d, and 510e), and one or more B-frames (e.g., 510b). As is known, an I-frame is a video frame that contains a complete picture, relying upon no other frame for completeness. In contrast, P-frames and B-frames are incomplete and rely on other frames for completeness. P-frames typically refer back to previous frames, whereas B-frames may refer forward or back. Typically, I-frames appear much less frequently than P-frames or B-frames, as I-frames are larger and more costly to store and transmit.

Splitting video data in object 160c works much like splitting CSV data in object 160a (FIGS. 3A and 3B). For example, splitter 220 may aim to produce portions 250 that have sizes equal to or slightly greater than a target size 320. Splitter 220 attempts to find the first boundary 252 in the data object that arises after passing the target size. For detecting boundaries in video data, splitter 220 may be configured to identify I-frames, which provide natural boundaries because they do not require references to earlier or later frames. In the example shown, splitter 220 identifies the next boundary beyond the target size 320 as I-frame 510c.

Splitting the video just before I-frame 510c creates a problem, however, as B-frame 510b references I-frame 510c and thus cannot be rendered without it. If splitter 220 were to split the video immediately after B-frame 510b, then a gap in the video would appear in the segment that contains B-frame 510b. That segment would thus be incomplete, as it would have a dependency on another segment.

FIG. 5B shows an example solution. Here, the object 160c as processed so far is rendered as two segments, 570a and 570b. To resolve the dependency, segment 570a is provided with a copy 510cc of I-frame 510c. The copy 510cc provides the necessary reference from B-frame 510b and avoids a dropped video frame when rendering segment 570a. Mean-while, segment 570b retains I-frame 510c as its first frame, thus providing an independent baseline for starting segment 570b. Subsequent frames, e.g., 510d and 510e, may rely on I-frame 510c for completeness, but none of the subsequent frames refer to any frame prior to I-frame 510c. Thus, each of the segments 570a and 570b is rendered as an independently and individually-processable unit, with no dependencies on other segments for completeness.

Figure 6:
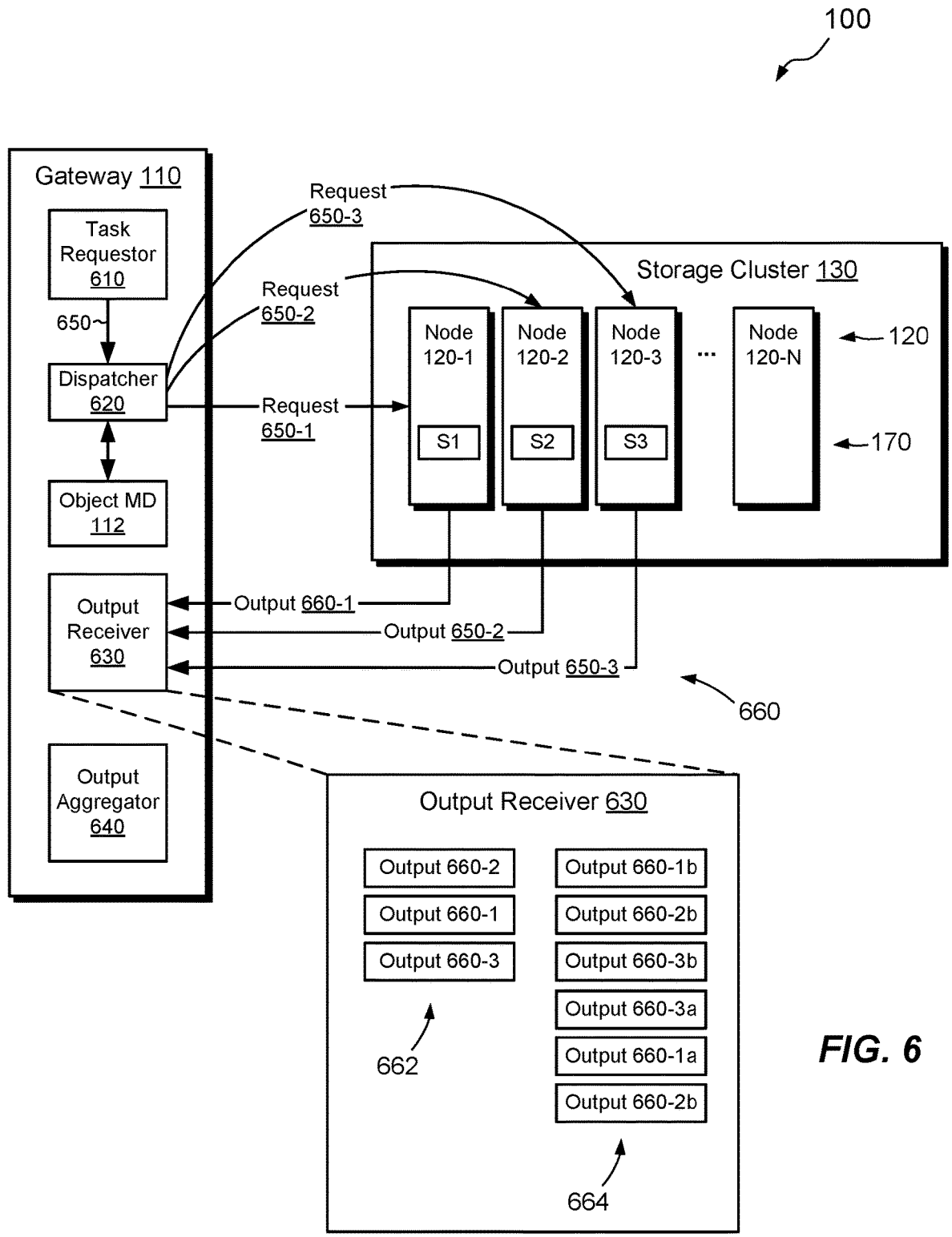
FIG. 6 is a block diagram showing an example arrangement for performing a distributed processing task in the environment of FIG. 1.

FIG. 6 shows an example arrangement for performing distributed processing in accordance with additional embodiments. The depicted arrangement may be implemented in the environment 100 of FIG. 1 or in other environments. The ensuing description assumes an implementation in the environment 100, such that the above-described features form parts of the instant embodiments. In other examples, the FIG. 6 arrangement may be implemented in other environments having different features. Therefore, the features described above should be regarded as illustrative examples but not as required unless specifically indicated.

As shown in FIG. 6, the gateway 110 includes components that support its role in performing distributed processing. These include a task requestor 610, a dispatcher 620, an output receiver 630, and an output aggregator 640, in addition to the above-described object metadata 112.

In example operation, the task requestor 610 initiates a request 650 for performing a processing task on a specified data object 160 (or set of objects 160). Various types of tasks are contemplated. These may include, for example, reads and/or queries of specified data (e.g., for tabular or tree-based data objects). Types of queries may include SQL (Simple Query Language) queries, key-value lookups, noSQL queries, and the like. Tasks for video data objects may include distributed video-processing tasks, such as searches for specified graphical content (e.g., faces, license plates, geographical features, and the like). Tasks for audio data objects may include searches for spoken words, voice characteristics (e.g., tone, accent, pitch, etc.), particular sounds, or the like. Essentially, any task that is amenable to splitting among multiple nodes 120 and involves access to potentially large amounts of data is a good candidate for processing in the arrangement of FIG. 6.

Upon issuance of the request 650, dispatcher 620 begins distributing components of the requested task to the respective nodes 120. For example, dispatcher 620 checks object metadata 112 to identify segments 170 of the specified data object 160 (or set of objects) and their respective locations in the storage cluster 130. In the simplified example shown, the object metadata 112 identifies three segments 170 (e.g., S1, S2, and S3), which make up the data object 160 (typical results may include tens or hundreds of segments) and three computing nodes 120-1, 120-2, and 120-3 that store the respective segments 170.

Dispatcher 620 then transmits requests 650-1, 650-2, and 650-3 to the identified nodes 120-1, 120-2, and 120-3, respectively. Requests 650-1, 650-2, and 650-3 may be similar or identical to request 650, e.g., they may provide the same query or other task as specified in request 650. Such requests 650-1, 650-2, and 650-3 need not be identical to one another, however. For example, some requests may include segment-specific metadata (e.g., stored in object metadata 112) that differs from that sent in other requests, and which may be used to guide a processing task on a particular node.

The identified nodes 120-1, 120-2, and 120-3 receive the requests 650-1, 650-2, and 650-3, respectively, and each of these nodes begins executing the requested task on its respective segment. For example, node 120-1 executes the task on segment S1, node 120-2 executes the task on segment S2, and node 120-3 executes the task on segment S3. In an example, each node 120 independently executes its respective task on its respective segment 170, without needing to contact any other node 120. For instance, node 120-1 completes its work by accessing only S1, without requiring access to S2 or S3. Likewise for the other nodes.

As the nodes 120-1, 120-2, and 120-3 perform their respective work, such nodes produce respective output 660, shown as output 660-1 from node 120-1, output 660-2 from node 120-2, and output 660-3 from node 120-3. The participating nodes send their respective output 660 back to the gateway 110, which collects the output in output receiver 630.

As shown in the expanded view near the bottom of FIG. 6, output receiver 630 may receive output 660 from participating nodes 120 in any order. In a first scenario, the nodes 120-1, 120-2, and 120-3 are configured to wait for their respective tasks to complete before sending back their output. In this case, the output 660 from a particular node may arrive all at once, with output from different nodes arriving at different times, based on their respective times of completion. Output data 662 shows example results according to this first scenario. Here, output 660-2 from node 120-2 arrives first and thus appears first in the output data 662, followed by output 660-1 (from node 120-1), and then by output 660-3, which arrives last (from node 120-3). Output 660 is thus interleaved in the output data 662.

In a second scenario, nodes 120-1, 120-2, and 120-3 are configured to return their output in increments, such as immediately upon such increments becoming available. In this second scenario, each participating node may return its output 660 in multiple transmissions, which may be spread out over time. Output data 664 shows example results according to this scenario. Here, output data 664 is seen to include six different batches (660-1a, 660-1b, 660-2a, 660-2b, 660-3a, and 660-3b), i.e., two batches of output from each of nodes 120-1, 120-2, and 120-3. The batches appear in output data 664 in the order received, which thus may be interleaved at finer granularity than was seen in the first scenario.

Of course, gateway 110 may sort the output 660 in any desired manner, and any node 120 of the storage cluster 130 may be called upon to perform this task. In some examples, both the affected nodes and the gateway 110 may participate in sorting the output 660. For example, each of the nodes may sort its respective output, such that each of the results 660-1, 660-2, or 660-3 arrives individually in sorted order. The gateway 110 may then complete the work, e.g., by employing the aggregator 640 for sorting among the sorted sets of returned results.

Sorting takes time, and many processing tasks value speed more highly than sorted output. To further promote high-speed operation, the computing nodes 120 may in some examples employ RDMA (remote direct memory access) when returning output 660 to the gateway 110.

For some processing tasks, dispatcher 620 may send processing requests to all involved nodes (i.e., to all nodes that store segments of the subject data object). In other examples, dispatcher 620 may limit the nodes to which requests are sent, e.g., based on knowledge of a priori segment contents, byte ranges of segments, or other factors. Limiting the number of involved nodes in this manner helps to reduce traffic over the network 140 (FIG. 1), further promoting efficiency.

Some processing tasks may involve aggregation. For example, a query may request a count of records that meet specified criteria, rather than the records themselves. A query may also request an average value, a maximum value, a minimum value, or some other aggregate value. Nodes 120 may perform certain aggregate functions themselves (e.g., count, total, max, min, etc.), but individual nodes 120 do not typically aggregate output across multiple nodes. Rather, this function may be performed by the data aggregator 640. For example, aggregator 640 may receive counts from multiple nodes, with each providing partial aggregate results derived from its processing on a respective segment. Aggregator 640 may then sum the counts from the responding nodes to produce an aggregate total for the entire data object 160. To produce an aggregated average for a data object, for example, aggregator 640 may direct each participating node to provide both a count and a total. It may then sum all counts returned to produce an aggregate count, sum all totals to produce an aggregate total, and then divide the aggregate total by the aggregate count to produce the desired aggregate average. Other types of aggregate functions may be performed in a similar way.

One should appreciate that the arrangement of FIG. 6 may perform aggregate queries at exceedingly low cost in terms of bandwidth. As each participating node computes a local aggregate and returns only its results, aggregate queries can run across very large datasets and produce very little output 660, which may normally be less than 1 kB and may often be as little as a few bytes.

Although the gateway 110 has been shown and described as the originator of task requests 650, as the dispatcher of requests to affected nodes, and as the collector of output 660 from the nodes, these functions may alternatively be performed by other computers, or by multiple computers. Indeed, they may be performed by one or more nodes 120 of the storage cluster 130. The example shown is thus intended to be illustrative rather than limiting.

Figure 7:
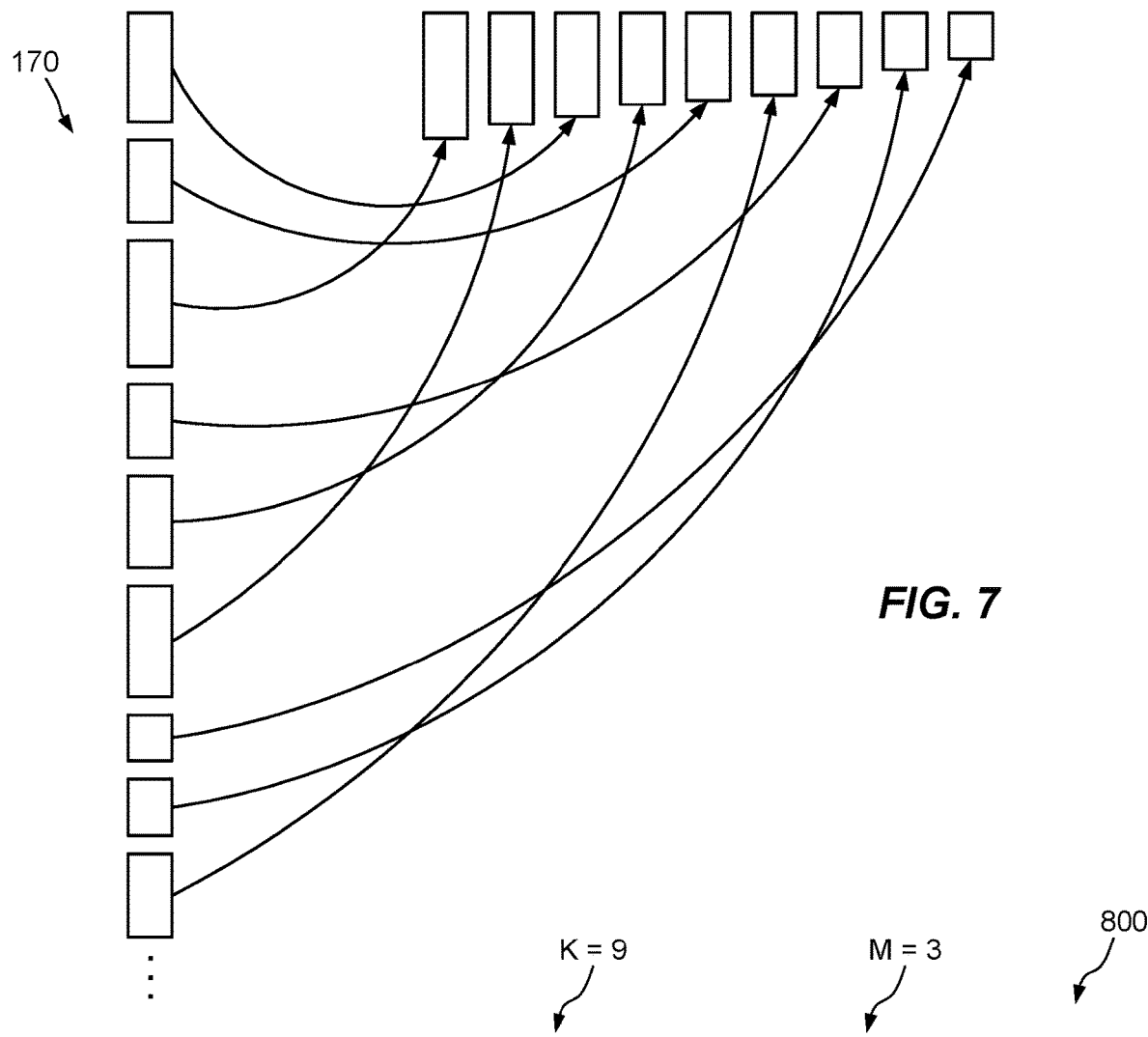
FIG. 7 is a block diagram showing an example arrangement of multiple segments of a data object in order of decreasing size.
Figure 8:
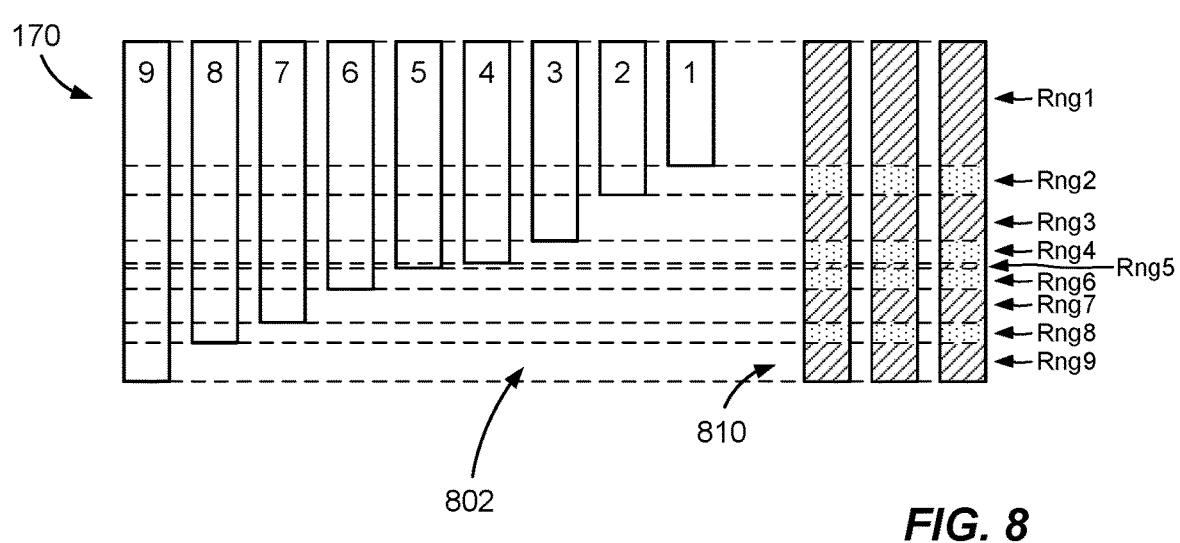
FIG. 8 is a block diagram showing an example arrangement for erasure coding the segments shown in FIG. 7.

FIGS. 7 and 8 show an example arrangement for performing data protection of segments 170 in accordance with additional embodiments. The depicted arrangement of FIGS. 6 and 7 may be implemented in the environment 100 of FIGS. 1 and/or 6 or in environments different from those illustrated above.

FIG. 7 shows multiple segments 170 that have been produced from a single data object 160, with the segments 170 arranged vertically. Although not required, the segments 170 may be arranged in order, in this case with the earliest-created segment (closest to the beginning of the object) appearing on top and with vertically adjacent segments 170 corresponding to adjacent portions of the data object 160. Nine (9) segments 170 are shown, with the understanding that many more than nine segments 170 may be produced from the data object 160. In an example, the depicted nine segments 170 are the first nine segments produced from the data object (e.g., by splitter 220 and transformer 230; FIG. 2).

Notably, the segments 170 have different respective lengths. It is thus possible to rank the segments 170 in order of length, e.g., from longest to shortest, as shown at the top-right of the figure.

FIG. 8 shows an enlarged view of the same ranked segments 170. Here, K+M erasure-code processing is performed on the nine segments (K=9) (e.g., by gateway 110) to generate M=3 elements 810 of repair data, which provide various forms of parity information. The K segments together with the M repair elements make up a repair group 802 that includes a total of 12 elements overall.

The depicted repair group 802 allows for damage to up to M elements prior to experiencing data loss. The damaged elements may be any elements of the repair group 802, which may include data segments 170 and/or repair elements 810, in any combination. Complete recovery and repair can be achieved as long as no greater than M total elements are damaged. One should appreciate that the choices of K=9 and M=3 may be varied, based upon a desired level of data protection, among other factors. In an example, repair elements 810 are generated using a computationally efficient procedure 800 that appears to be entirely new.

Prior erasure-coding schemes may require all K data elements to have equal length. If data elements have unequal lengths, then zero padding may be used to make the lengths equal. Parity calculations are then performed using the full length of all K data elements, producing M parity elements having the same length as the K data elements.

In contrast with the usual erasure-coding approach, the procedure 800 generates repair elements from data elements that have unequal lengths. No zero-padding is required. In an example, procedure 800 proceeds by logically aligning the segments 170, i.e., the K=9 data elements. For example, the segments 170 may be aligned at their respective tops, as shown. Alternatively, the segments 170 may be aligned at their respective bottoms (not shown) or may be aligned in some other known way. Note that such alignment is logical rather than physical, as no actual movement of any segment 170 is required. Also, the depicted ranking of segments 170 should be understood to be logical rather than physical.

With the segments 270 logically aligned, the procedure 800 proceeds by identifying the shortest segment 170 (labeled "1") and identifying a corresponding range (Rng1). Rng1 aligns with Segment 1 and has the same size and limits. As Segment 1 is the shortest segment and the segments 170 are logically aligned, all of the K segments 170 (Segments 1-9) have data within Rng1. Using the Rng1 data across Segments 1-9, the procedure computes M sets of repair data, one set for each of the M repair elements 810, and places the repair data in the respective repair elements 810 at the location of Rng1. Repair data for Rng1 is thus complete, and such repair data is based on all K segments 170. One should appreciate that the computations herein of repair data may be similar to what is used in conventional K+M erasure coding, the details of which are not critical to embodiments and are not described further.

The procedure 800 then continues in a similar manner for additional ranges. For example, Rng2 corresponds to the part of Segment 2 that extends beyond Segment 1, i.e., the part of Segment 2 for which no repair data has yet been computed. As Segment 1 has no data in Rng2, repair data for Rng2 may be computed using only the corresponding parts of Segments 2-9 (i.e., a total of K-1 segments). As before, the procedure computes M sets of repair data, one set for each of the M repair elements 810, and places the repair data in the respective repair elements 810, this time at the location of Rng2. Repair data for rng2 is thus complete, but such repair data is based on only K-1 segments 170.

The procedure 800 may continue in this manner for each of ranges Rng3 through Rng8, with the computations of repair data for each range involving one fewer segment than do the computations for the immediately preceding range. Thus, the computations for Rng3 involve K-2 segments, the computations for Rng4 involve K-3 segments, and so on, with the computations for Rng8 involving only K-7 segments, i.e., Segments 8 and 9. It is noted that no computation is needed for Rng9, as Rng9 intersects only a single segment (Segment 9). Rather than computing repair data for Rng9, the procedure 800 instead stores replicas (copies) of the affected data, i.e., the portion of Segment 9 within Rng9. A separate copy of the Rng9 data may be provided at the Rng9 location of each of the repair elements 810.

The erasure-coding procedure 800 is typically faster to compute than conventional erasure coding. Instead of requiring all K data elements for computing repair data of M repair elements 810, the procedure 800 requires K data elements for only the shortest data element. For each next-shortest data element, the procedure 800 requires one fewer data element, eventually requiring only two data elements, and thus reduces computational complexity and execution time.

One should appreciate that segments 170 as produced from objects 160 may be protected using the erasure-coding procedure 800. For example, when distributing segments 170 to computing nodes 120 for storage in the cluster 130, gateway 110 (or some other computer) may perform the procedure 800 to generate repair elements 810 at reduced computational cost. The procedure 800 may operate with K segments 170 at a time, producing M repair elements for each, and forming respective repair groups 802 for each set of K+M elements.

Figure 9:
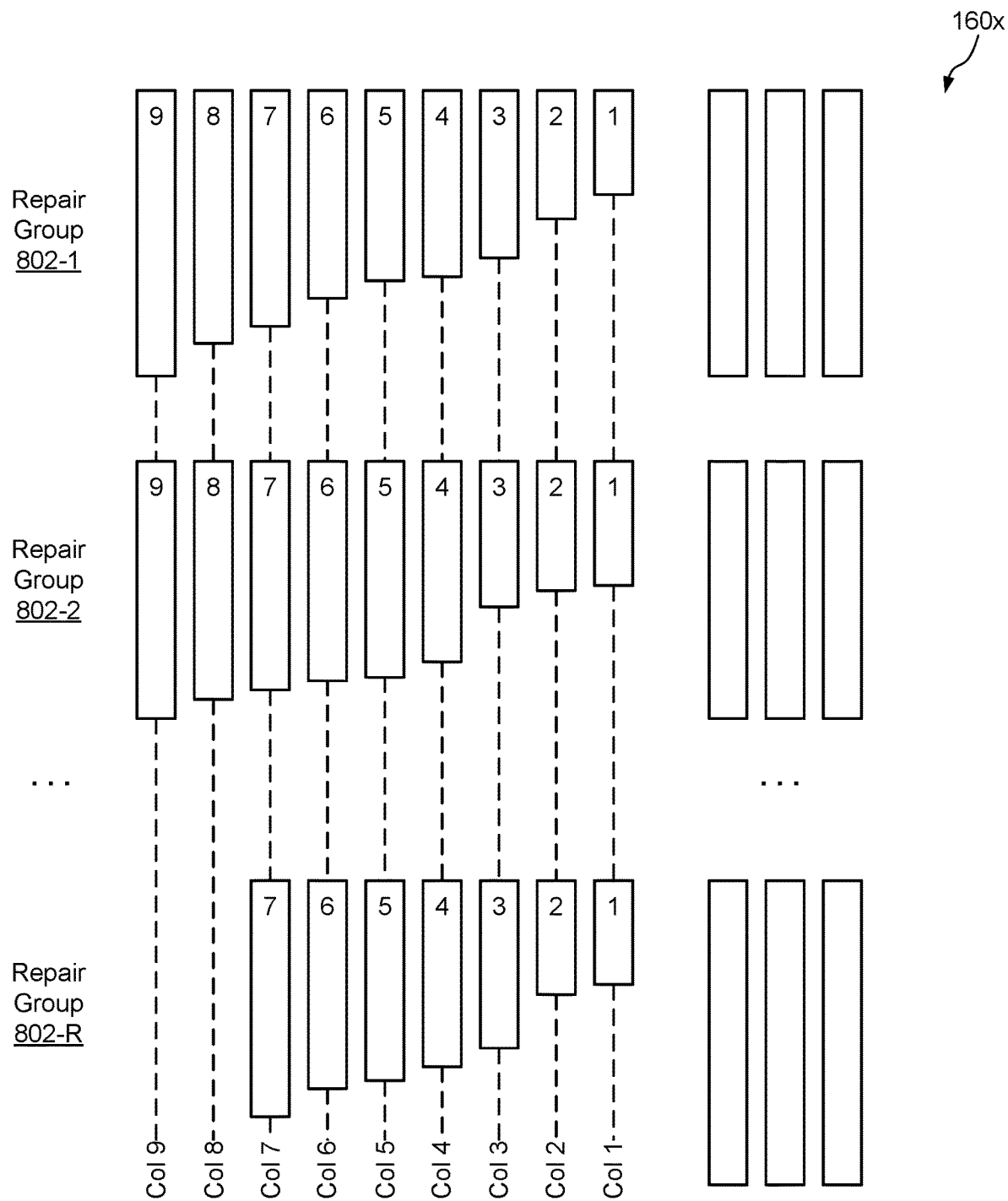
FIG. 9 is a block diagram showing multiple repair groups formed from segments created from a data object.

FIG. 9 shows an example arrangement of multiple repair groups 802, which may be used for protecting a particular data object 160x. As shown, repair groups 802-1, 802-2, and so forth up to 802-R, provide data protection for data object 160x, e.g., using the erasure-coding procedure 802. The first repair group 802-1 includes and protects a first group of K segments 170 produced from the data object 160x, the second repair group 802-2 includes and protects a second group of K segments 170 produced from the same data object 160x, and so on, up to the $R^{th}$ repair group 802-R, which protects a last group of segments 170. It is noted that repair group 802-R contains fewer than K segments. For example, the data object 160x may have ended (run out of data) after producing only seven segments. The segments 170 that make up the repair groups 802 are seen to be arranged in columns (Col 1 to Col 9), with each column corresponding to a respective one of the K elements.

It should be appreciated that erasure coding may place certain constraints on data placement. For example, no two segments 170 that belong to the same repair group 802 should normally be stored on the same disk drive (e.g., SSD, magnetic disk drive, etc.), as doing so would undermine the redundancy of the erasure coding and subject the segments to an increased risk of data loss. For similar reasons, no two segments 170 that belong to the same repair group 802 should normally be stored on the same computing node 120, as doing so would reduce redundancy, e.g., in the event of a failure of the computing node 120. These rules do not typically apply across different repair groups 802, however. For example, no substantial loss of redundancy results from storing segments 170 that belong to different repair groups 802 on the same computing node 120, as long as no two segments belong to the same repair group 802. For example, it may be permissible for a single computing node 120 to store one segment 170 from each of the R repair groups that protect a given data object 160 (a total of R segments of the same data object).

It should further be appreciated that erasure coding is but one way to protect data, with another way being replication. In an example, data objects 160 and their associated repair data and/or replicas reside in buckets of an object store, and data protection schemes are applied on a per-bucket basis. A bucket that uses replication for its data protection will thus use replication for protecting all of its contents, including all objects 160 contained therein. Likewise, a bucket that uses erasure coding for its data protection will use erasure coding for all of its contents. Erasure coding parameters K and M may also be selected and applied on a per-bucket basis. Thus, the arrangement in FIG. 9 may use erasure coding with K=9 and M=3 because the bucket that contains object 160x uses these settings, which are thus applied globally to all contents of the bucket.

Figure 10:
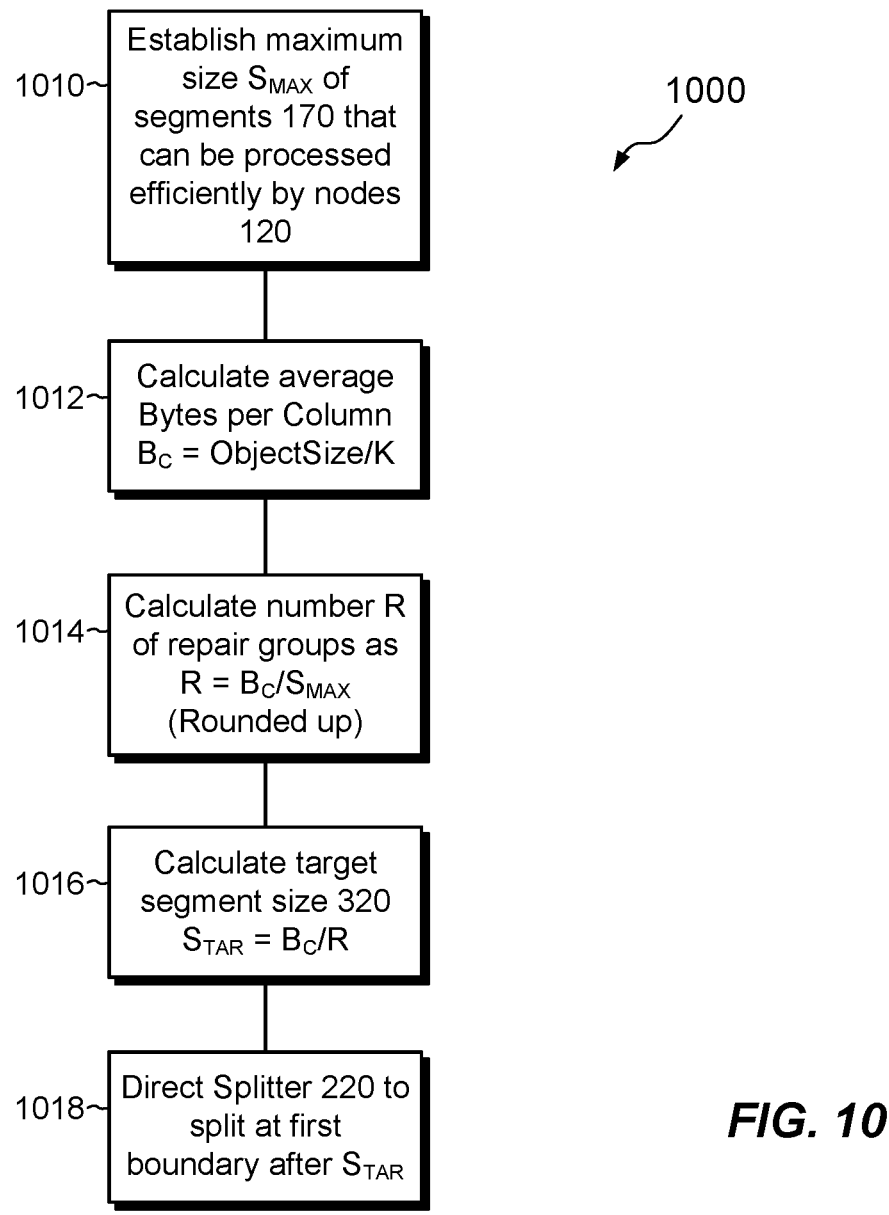
FIG. 10 is a flowchart showing an example method of determining a desired target size of segments.

FIG. 10 shows an example method 1000 for determining various quantities used in managing a data object 160 and its segments 170. The method 1000 assumes data protection using erasure coding, and may be used for determining a desired target size 320 of segments 170 (FIG. 3), as well as a number R of repair groups 802 to be used for protecting the data object 160 (FIG. 9). The method 1000 may be performed, for example, by the gateway 110, by a node 120 of the storage cluster 130, or by some other computer that can connect to the cluster 130. At the beginning of method 1000, the size of the data object 160 and the number K (as used in K+M erasure coding) are assumed to be known in advance.

At 1010, the method 1000 establishes a maximum size $S_{MAX}$ of segments 170 that can be processed efficiently by nodes 120. The maximum size may be based on practical considerations, such as hardware specifications of nodes 120 (e.g., clock speed, number of cores, amount of memory, and so forth), as well as expected latency to processing tasks and expectations of users. Typical ranges of $S_{MAX}$ may fall between several hundred kilobytes and several megabytes, for example.

At 1012, the method computes an average number of bytes per column, $B_C$. In an example, the value of $B_C$ may be based upon the size "ObjectSize" of the data object 160 and on the number K used in the K+M erasure coding used to protect the data object 160. For example, $B_C$=ObjectSize/ K. Referring briefly back to FIG. 9, it can be seen that $B_C$ represents the average amount of per-column data in a depicted column.

At 1014, the method 1000 calculates a number R of repair groups, e.g., by dividing $B_C$ by $S_{MAX}$ and rounding up to the nearest integer. More specifically, the number of repair groups may be calculated as R=$B_C$/$S_{MAX}$, rounded up.

At 1016, the method calculates the target segment size 320 as $S_{TAR}$=$B_C$/R. The resulting quantity $S_{TAR}$ may be provided to splitter 220, e.g., in determining where to start searching for boundaries 252 when splitting the data object 160.

At 1018, the method 1000 directs the splitter 220 to split the data object 160 in a way that produces portions 250 that are at least as large as $S_{TAR}$, e.g., to produce portions 250 that extend to the next boundary 252 beyond $S_{TAR}$.

Method 1000 thus provides useful guidelines for establishing the target segment size 320 and the number R of repair groups to be used for a particular data object 160. Actual selections of these quantities may involve the discretion of administrators and may be driven by other factors besides those described. Thus, the method 1000 is intended to be advisory rather than required.

Figure 11:
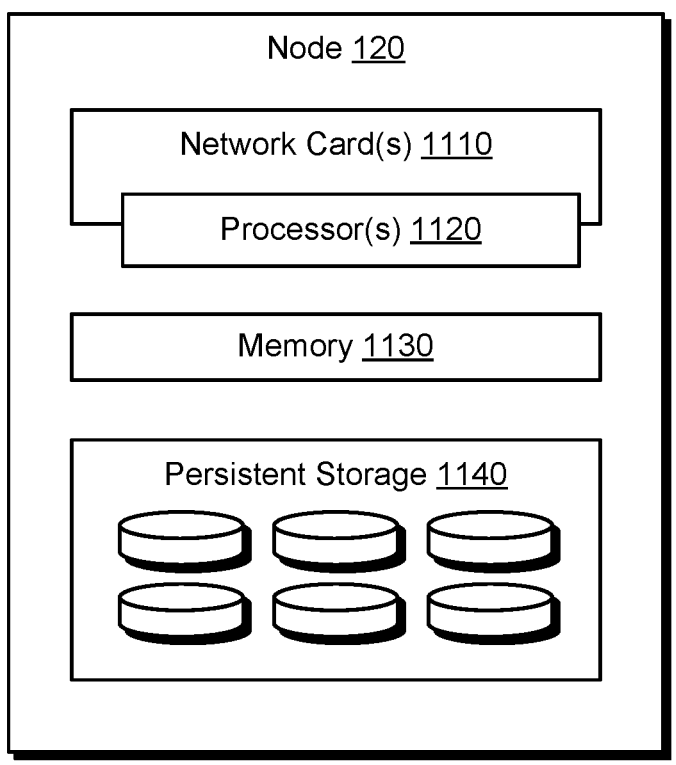
FIG. 11 is a block diagram of an example computing node that may be used in the environment of FIGS. 1 and 6.

FIG. 11 shows an example computing node 120 in additional detail. The computing node 120 is intended to be representative of the computing nodes 120-1, 120-2, and 120-3 of the storage cluster 130. It is also intended to be representative of the gateway 110 of FIG. 1.

As shown, computing node 120 includes one or more communication interfaces, such as one or more network interface cards (NICs) 1110, a set of processors 1120, such as one or more processing chips and/or assemblies, memory 1130, such as volatile memory for running software, and persistent storage 1140, such as one or more solid-state disks (SSDs), magnetic disk drives, or the like. The set of processors 1120 and the memory 1130 together form control circuitry, which is constructed and arranged to carry out various methods and functions as described herein. Also, the memory 1130 includes a variety of software constructs, such as those shown in FIGS. 1 and 2, which are realized in the form of executable instructions. When the executable instructions are run by the set of processors 1120, the set of processors 1120 carry out the operations of the software constructs. In an example, one or more of the set of processors 1120 may reside in the network card(s) 1110, which may facilitate high-speed communication over the network 140, thus promoting bandwidth and efficiency.

FIGS. 12, 13, and 14 show example methods 1200, 1300, and 1400, which may be carried out in connection with the environment 100 and provide a summary of some of the features described above. The methods 1200, 1300, and 1400. Such methods are typically performed, for example, by the software constructs described in connection with FIGS. 1 and 2. The various acts of methods 1200, 1300, and 1400 may be ordered in any suitable way. Accordingly, embodiments may be constructed in which acts are performed in orders different from those illustrated, which may include performing some acts simultaneously.

FIG. 12 shows an example method 1200 of managing data objects. At 1210, a data object 160 is split into multiple portions 250 at boundaries 252 within the data object 160 (see FIG. 2). The boundaries 252 provide separators between processable units 250 of the data object 160 in accordance with a type of the data object (e.g., CSV, JSON, XML, Parquet, video, and so forth). At 1220, the portions 250 are transformed into segments 170 that provide individually processable units of a same type as the type of the data object 160. For example, data and/or metadata may be copied from one portion 250 to other portions, and other modifications may be made, to reduce or eliminate dependencies between and among segments 170. At 1230, the segments 170 are distributed among multiple computing nodes 120 of a storage cluster 130 for storage therein.

FIG. 13 shows an example method 1300 of managing data objects. At 1310, a data object 160 is split into multiple segments 170, e.g., by operation of splitter 220 (FIG. 2). At 1320, the segments 170 are distributed among multiple computing nodes 120 of a storage cluster 130. At 1330, a distributed processing task is performed by the storage cluster 130. The distributed processing task executes independently by multiple respective computing nodes 120 of the storage cluster 130 on respective segments 170 or sets of segments 170 stored therein.

FIG. 14 shows an example method 1400 of managing data objects. At 1410, a data object 160 is split into multiple segments 170, at least some of the segments 170 having lengths that differ from one another (see FIGS. 7 and 8). At 1420, the segments 170 are distributed across multiple computing nodes 120 of a storage cluster 130. At 1430, K of the segments 170 are protected using M elements 810 of repair data generated from the K segments, each of the M elements 810 having multiple ranges (e.g., Rng1, Rng2, etc.) that store repair data computed from respective groupings of segments selected from the K segments (e.g., one grouping with K segments, one grouping with K-1 segments, and so forth).

A technique has been described for managing data objects 160 in a storage cluster 130. The technique includes splitting a data object 160 into multiple portions 250 at boundaries 252 within the data object 160. The technique further includes transforming the portions 250 of the data object 160 into segments 170 that provide individually processable units, and distributing the segments 170 among multiple computing nodes 120 of the storage cluster 130 for storage therein.

Section II: Partitioning, Processing, and Protecting Media Data

This section describes examples of partitioning, processing, and protecting data as applied to media data. One should appreciate that any of the features and methodology as described in Section I may be used in embodiments described in this Section II.

Overview of Section-II Content:

An improved technique for processing media data includes partitioning a media data object into portions at boundaries within the media data object. The technique further includes transforming the portions of the media data object into segments that provide individually processable units and distributing the segments among multiple computing nodes of the storage cluster for storage therein.

In some examples, the technique further includes identifying metadata in the media data object and storing the metadata in a metadata object separately from the segments containing media data. In some examples, the metadata object may be stored in a distributed manner over a network.

In some examples, the technique further includes reconstituting the media data object from the segments and the metadata object.

In some examples, the technique further includes detecting that the media data object is a media file, rather than some other type of file or object. In such examples, partitioning the media file into the segments at boundaries is based on the detection that the media data object is a media file. According to some examples, detecting that the media data object is a media file includes identifying a byte pattern in the media data object that specifies a media file type.

In some examples, partitioning a media data object into portions includes splitting the media data object at boundaries defined by IDR (Instantaneous Decoder Refresh) frames.

In some examples, a portion includes an IDR-frame set, which begins with an IDR frame and ends with a frame just prior to a next IDR frame.

Some examples further include generating timing metadata for one or more of the segments, the timing metadata for a segment indicating a time range of media data included within the respective segment.

Some examples further include receiving a query to access a specified time range of the media data object. Such examples further include identifying, based on the timing metadata, one or more of the segments that include media for the specified time range.

In some examples, generating the timing metadata for a segment is based at least in part on (i) a number of frames per second (FPS) indicated by the file metadata and (ii) frame sequence identifiers of a first frame and a last frame included in the segment.

Some examples further include generating byte-location metadata for at least one of the segments, the byte-location metadata for a segment indicating a range of bytes of the video content included in the segment.

Some examples further include generating per-segment metadata for respective segments, the per-segment metadata enabling the respective segments to be accessed, played, and/or analyzed as standalone media files.

In some examples, generating the per-segment metadata for a segment includes obtaining metadata from the metadata object and generating metadata specifically for the segment.

Some examples further include performing video analytics on respective segments of the video data.

Some examples include storing an AI (artificial intelligence) filter in a distributed manner on the network, the AI filter configured to perform video analytics.

In some examples, the AI filter includes a neural network configured to locate a specified class of objects in a video source.

Some examples include enforcing an upper limit on a number of storage nodes on the network that are permitted to store the segments. In some examples, one or more of the storage nodes on the network stores multiple segments of media content.

In some examples, partitioning the media data object includes identifying IDR frames based at least in part on per-frame metadata provided in the media data object.

In some examples, partitioning the media data object includes providing continuous ranges of video data with durations that do not fall below a predetermined minimum limit.

In some examples, the media data object includes audio data and the technique further includes partitioning the audio data of the media data object into portions of audio data.

In some examples, the portions of audio data do not also include video data, and portions of the video data do not include audio data.

In some examples, partitioning the audio data includes providing continuous ranges of audio data in respective portions.

In some examples, partitioning the audio data includes providing the continuous ranges of audio data with durations that do not fall below a predetermined minimum limit.

In some examples, partitioning the audio data produces portions of audio data that have a size that substantially matches a size of portions of video content.

In some examples, partitioning the audio data includes providing a region of overlap in audio data between at least two consecutive segments of audio data.

In another aspect, an improved technique for processing media data includes partitioning audio data of a media data object into portions of audio content at boundaries based on duration of audio content. The technique further includes identifying metadata in the media data object and storing the metadata in a metadata object separate from the audio data. The metadata object and the portions of audio content may then be stored in a distributed manner over a network.

Figure 15:
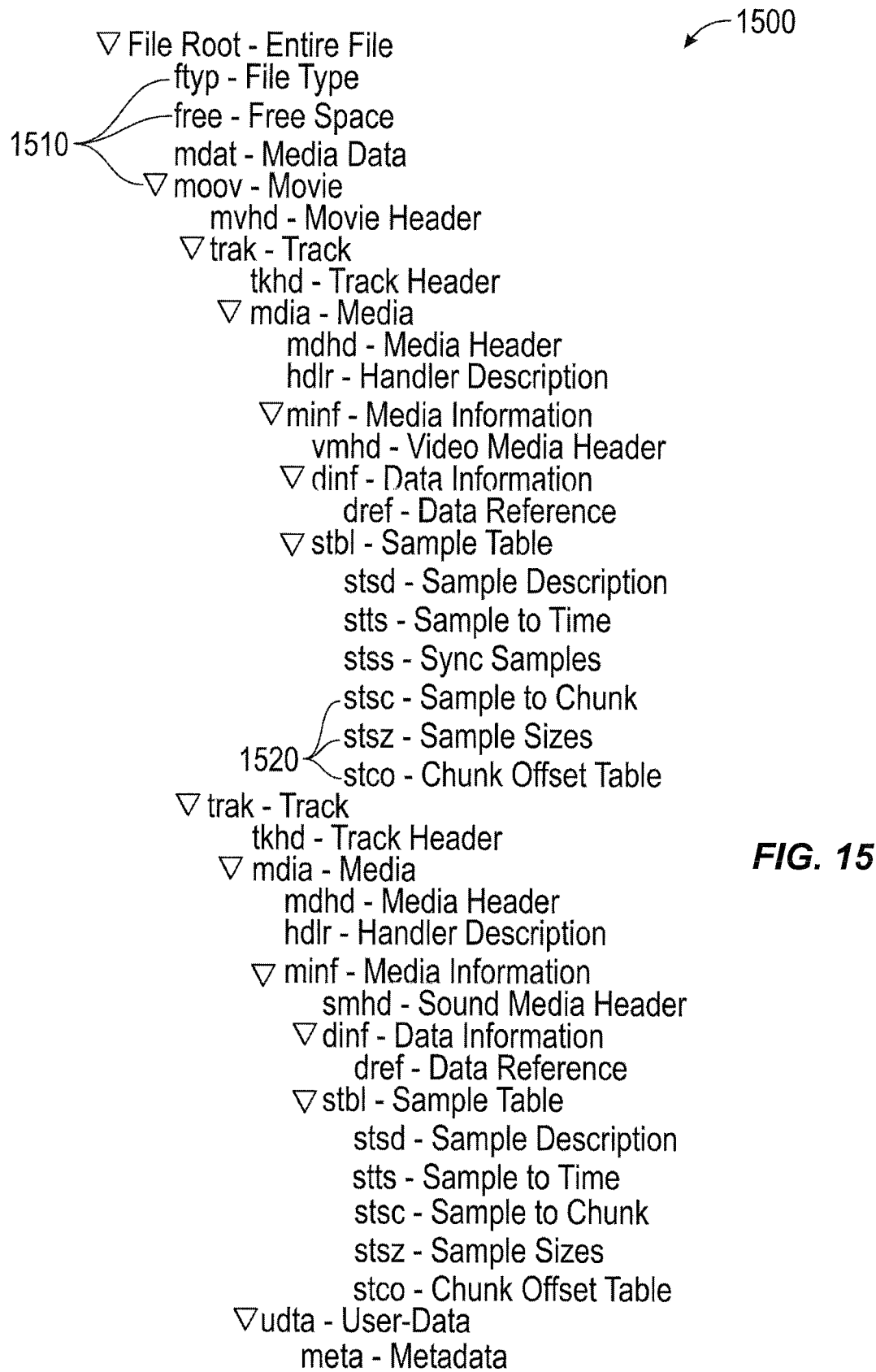
FIG. 15 is a block diagram showing an example structure of a media data object.

Description of Section-II Content:

FIG. 15 shows an example structure of a media data object 1500 with which embodiments of the disclosure may be practiced. The depicted media data object 1500 may be provided, for example, as an MP4 movie container file. In an example, the depicted structure encapsulates H.264 video and AAC-LC audio. Other structures and codecs may be used, however. As illustrated in the figure, the MP4 movie container file format has a specific hierarchy of elements called Atoms (in MPEG-4 terminology, they are called Boxes).

As shown in FIG. 15, the container file includes metadata as well as media data, such as video data, audio data, and/or subtitle data. The general structure of the MP4 movie container file is a hierarchy divided into 4 atoms, specifically the: 'ftyp' atom; 'free' atom; 'mdat' atom; and 'moov' atom. Every single element in this hierarchy has 4 unique bytes as its identifier. For example, for the 4 main atoms, their identifier bytes are as follows:

```
'ftyp': '66747970'
'moov': '6d6f6f76'
'free': '66726565'
'mdat': '6d646174'
```

We use these identifier bytes to locate the information in these atoms so that we can extract the data needed to reconstruct the file to its original state. In some examples, the 4-Byte identifiers are preceded by a 4-Byte values that indicate the lengths of the respective atoms.

We consider 'ftyp', 'free', and 'moov' all to be metadata 1510, and we save this metadata in a separate metadata object, such as a metadata file, during partitioning. We use the 'stsc', 'stsz', and 'stco' elements (collectively, 1520) under 'moov' for each track to find the exact byte range of each chunk of data. The data itself (i.e., video, audio, and/or subtitle data) is contained within 'mdat.' The 'hdlr' element indicates whether each respective track is for audio, video, or subtitle. In the description that follows, a "sample" corresponds to a frame of video or audio. A "chunk" consists of multiple consecutive samples (frames). A "stream" corresponds to a track of video or audio data.

'stsc' tells us how many samples are in each chunk (FIG. 16). For example, from the first three lines of 'List contents', we can know that chunk 1 has only one sample, chunks 2 to 5 each have three samples, and chunk 6 has four samples.

'stsz' tells us the specific size for each sample, e.g., in bytes (FIG. 17).

'stco' tells us the byte at which each chunk starts (FIG. 18).

Figure 19A:
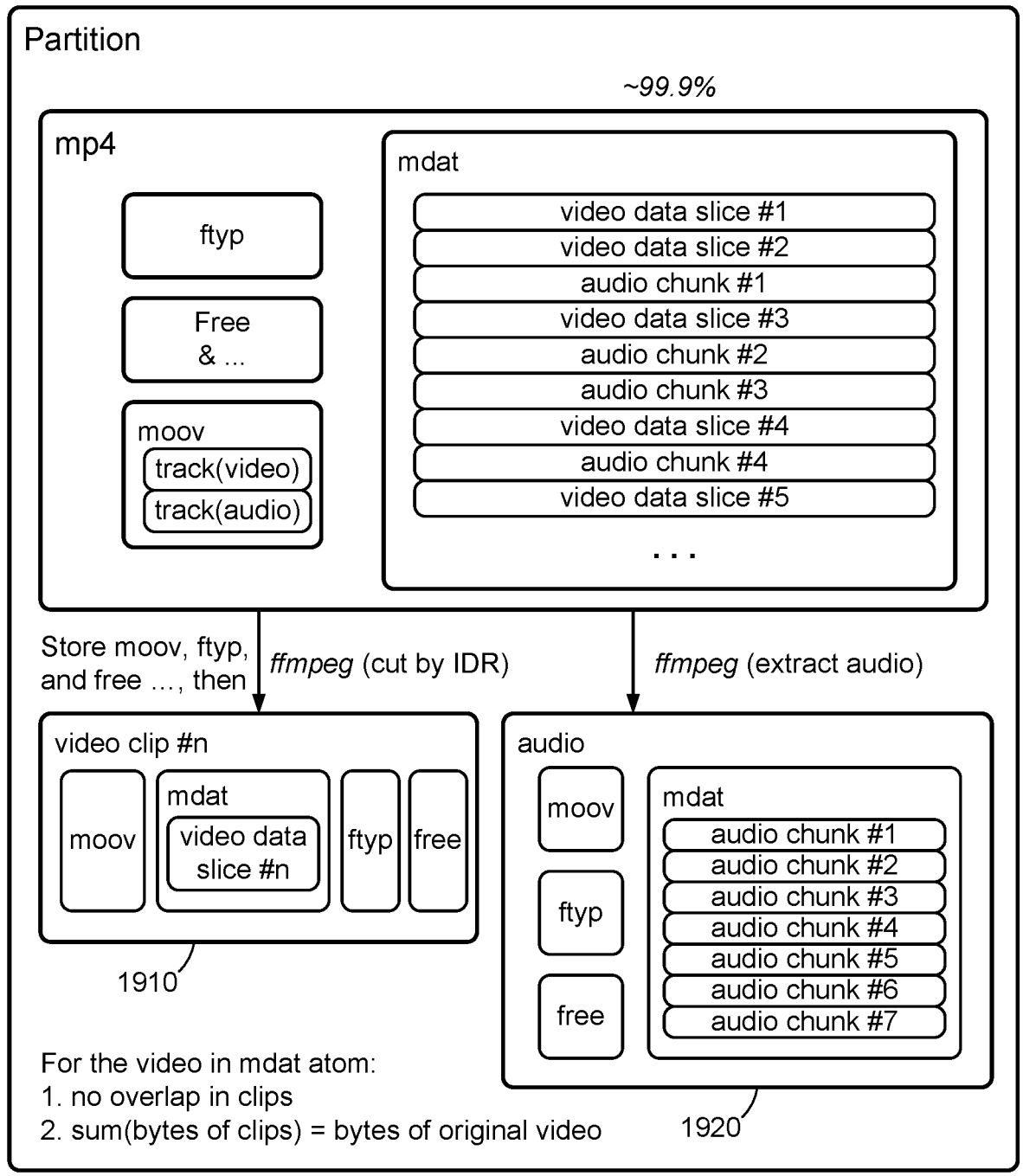

FIG. 19a shows a first example process for partitioning a media file, such as an MP4 file, into separate video clips 1910 (video clip #n) and separate audio clips 1920 ("audio"). The clips may be stored in respective files or other structures. For example, each of the n video clips may be stored in a respective file. The audio chunks may be stored together in a single file, or they may be split among multiple files. Video and audio clips may be provided separately in the media file 1500, and the above-described separate metadata file may be provided to store the metadata (e.g., ftyp, free, and moov) of the original media file 1500.

In an example, gateway 110 (FIG. 2) performs the partitioning of the media file 1500 into the video clips and audio clips, which may be provided in segments 170. Segments 170 may be stored in a distributed manner on nodes 120 (FIG. 1), i.e., in the same way as described in Section I for storing segments 170 for various types of data. Likewise, segments 170 storing video clips and segments 170 storing audio clips may be protected as described in connection with FIGS. 7-9. One should appreciate that some media files 1500 may include only video data or only audio data, whereas other media files 1500 may include both video data and audio data. The principles described herein apply to all of the above.

In an example, video data may be partitioned into video clips 1910 on boundaries based on IDR (Instantaneous Decoder Refresh) frames. As is known, an IDR frame is a special type of I-frame for which no frame occurring after the IDR frame can reference any frame that occurs before it. IDR frames thus provide convenient boundaries 252 (FIG. 2) at which to separate video data into distinct sets of video clips.

Each of the video clips includes any number of IDR-frame sets, including a single IDR frame set. An "IDR-frame set" is defined as a continuous set of video frames that begins with an IDR frame and extends to the last frame prior to the next IDR frame in the video data. In some examples, two IDR frames may be provided in an IDR-frame set (one at the beginning and one at the end), e.g., as described for I-frames in connection with FIG. 5B.

In an example, each of the audio clips stores audio from all audio tracks in the media file together (rather than storing separate tracks separately). Doing so promotes more effective playback and/or analysis of individual clips, as sounds from all tracks (e.g., left, right, center, rear, etc.) are kept together to provide an accurate representation of the recorded sound. When partitioning audio clips, the segments 170 of audio thus created may be required to meet or exceed a minimum size limit, such that enough sound is present to allow for meaningful analysis. An example of the minimum size limit may be several seconds (e.g., between 5 and 10 seconds). In addition, audio clips may be provided with some period of overlap (e.g., between 1 and 3 seconds, or any other suitable amount of time), to avoid cases where individual words or phrases are split between adjacent audio clips and thus rendered unintelligible in both.

Overlap regions may also be provided for adjacent video clips. For example, some video applications rely on detection of motion or other behavior to perform video analytics. Behavior cannot generally be detected based on individual frames, and thus some period of overlap may be needed to ensure that behaviors occurring at segment boundaries are not lost to detection. Another reason for overlap is if a previous segment includes a B-frame. If a segment includes a B-frame, it is preferable to include the immediately following IDR frame after the B-frame in the same segment (to ensure that the B-frame can be properly decoded). The previous segment may thus end with an IDR frame. As new segments typically start with IDR frames, the same IDR frame that ended the previous segment may be duplicated (as an overlap frame) as the first frame of the next segment.

In some examples, the overlap region (for audio and/or video) has a size, which may be expressed as a duration of time and/or as a specified number of frames. In some examples, the size of the overlap region is set to the maximum (longer) of (i) a specified duration of time and (ii) the time equivalent of a specified number of frames, such as a specified number of frames divided by the frame rate. In some examples, the size of the overlap region is a user-definable setting. For example, a user of the gateway 110 may operate a user interface that includes controls for configuring settings for splitting data objects. Such settings may include a desired overlap size, such as an overlap duration and/or number of frames. Users may wish to specify different overlap sizes for different applications. For example, some AI filters may require longer "warm-up" times than others to produce meaningful results, thus necessitating longer overlap sizes. In contrast, pattern-matching algorithms based on still images may require little or no overlap.

When splitting a media data object 1500, the gateway 110 may identify IDR candidate frames at or near a point in the media data object that corresponds to a desired target size 320 (FIG. 5a). For example, the gateway 110 may identify a first IDR frame in a vicinity of the desired target size and may proceed to identify a second IDR frame in a vicinity of the desired target size 320 plus the desired overlap size. The second IDR frame thus occurs later than the first IDR frame by a duration that approximately equals the desired overlap size. The gateway 110 may end a current portion 250 of the media data object at the second IDR frame and may begin a new (or next) portion at the first IDR frame. In this manner, the new portion begins before the current portion ends, thus establishing the desired overlap region. Both the current portion and the new portion include substantially the same region between the first IDR frame and the second IDR frame. If the current portion includes a B-frame without a subsequent IDR frame, then the second IDR frame may be included at the end of the current portion (e.g., as a duplicate). If the current portion does not include a B-frame without a subsequent IDR frame, then the last frame of the current portion may be the frame that immediately precedes the second IDR frame.

One should appreciate that the first IDR frame and the second IDR frame need not be consecutive. For example, any number of intervening IDR frames may appear between the first IDR frame and the second IDR frame.

Video clips, audio clips, and subtitle clips are preferably time-indexed to facilitate reconstruction and to enable searching and querying based on specified time ranges. The mp4 file format provides various metadata to enable this functionality, such as stts (sample-to-time) metadata, as well as FPS (frames per second) metadata and frame sequence numbers, which increment on each successive frame. In general, there is no need to align video clips with audio clips and/or subtitle clips when partitioning data. Clips may rather be partitioned and stored independently, with time indexing enabling their reconstruction, in whole or in part, on demand.

Video clips, audio clips, and subtitle clips are preferably also byte-indexed to facilitate reconstruction based on specified byte ranges. For example, the metadata file generated when partitioning the media file associates successive byte ranges of media-file data with corresponding segments 170 in which the data of those byte ranges are placed. The gateway 110 (FIG. 6) or some other system component can thus respond to a query for a specified byte range of the media file by issuing one or more requests for data from respective segments 170 identified from the metadata file. Such data can be gathered from the segment(s), reassembled in byte order, and returned to a requesting client. Further, per-segment metadata within respective segments 170 may allow specified byte ranges of data to be readily accessed within such segments, e.g., without extensive searching. As video data, audio data, and subtitle data may be stored separately (e.g., in separate segments 170), accessing a specified byte range of a media file that includes video, audio, and subtitle data typically may involve accessing multiple segments 170, obtaining respective byte ranges from those segments, and re-integrating the bytes for video with the bytes for audio and the bytes for subtitles so that the bytes are arranged in byte order.

In some examples, sizes of segments 170 containing audio clips may be provided to approximately match sizes of segments 170 containing video clips. For example, if a typical IDR-frame set is 5 MB in size, then audio data may be partitioned into clips that are about the same size, 5 MB. Providing segments 170 of both video and audio clips with similar sizes promotes efficient storage and erasure coding. One should appreciate, though, that providing video and audio segments of similar sizes is not required. For example, nothing herein prevents audio segments from being substantially smaller than video segments.

Preferably, each video clip in a segment 170 is provided as a standalone, playable media file. Likewise, each audio clip is provided as a standalone, playable media file. Rendering the video and audio clips in this manner may involve directly using certain metadata of the original media file (such as ftyp) and modifying the moov and free metadata atoms to describe only that portion of video or audio included in the respective clip. Various tools may be used to assist in partitioning the media file into video clips and audio clips and for reconstructing the original media file. These may include FFMPEG and the Python RE (Regular Expression) library, both of which are known in the art. Such tools provide suitable examples but are not required. Alternatives to these tools may include custom code written for a software product that performs the tasks of partitioning and reconstructing.

In an example, the partitioning process of FIG. 19*a* produces the following output:

A <videoname>.meta file that contains the metadata of the original media file.

an optional log file, logfile.txt, which may be used for dumping stdout/stderr of ffmpeg command.

A folder named other_streams, which contains streams other than video streams, such as audio streams and subtitle streams. The number attached to each audio file specifies the stream from which that audio is extracted. In some examples, audio streams may be sub-divided based on length.

A folder that contains video clips with no sound.

Resulting folders and files may be stored within a segment 170, or within multiple segments 170.

The particular file names, folder names, and organization of the above-described output is provided merely for illustration. Further, one should appreciate that the results of partitioning may be provided in data objects other than files.

As a more specific example, the partitioning process may include the following steps:

Step 1: Save metadata into a file named <videoname>.meta, which will be used during reconstruction.

Determine the order of the atoms 'ftyp', 'moov', and 'free'

Extract their information and save them into <videoname>.meta.

Step 2: Save audio data

Step 3: Cut the video into the desired portions, containing only video (no audio) data.

FIG. 19*b* shows a second example process for partitioning a media file, such as an MP4 file, into separate video clips (video clip #n), separate audio clips ("audio clip #n"), and separate subtitle clips (subtitle clip #n).

The partitioning process of FIG. 19*b* may include the following steps:

Step 1: Save metadata into a file named name.meta, which will be used during reconstruction.

Determine the order of the atoms 'ftyp', 'moov', and 'free'.

Extract their information and save them into name.meta.

Step 2: Cut video while ignoring the audio. For example, use the following ffmpeg command: ffmpeg -i{1}-f segment -segment_frames {2}-reset_timestamps 1 -c copy -an -log level quiet "{3}/clip_%d.mp4", where {1}=input file path;

{2}=IDR frame candidates; Two or more candidates may be listed. For N candidates listed, create N–1 partitions. If two candidates are listed (N=2), this can be used repeatedly as a means of partitioning with specified overlap between successive commands. If greater than two candidates are listed (N>2), the FFMPEG command will create segments for each pair with no overlap. Note, any segment which contains a B-frame should have the following IDR frame included in its segment; overlap is not required if an intervening IDR frame is present.

{3}=path for the newly generated clips.

The above command cuts the video at selected IDR frame candidates.

Step 3: Cut audio while ignoring the video. For example, use the following ffmpeg command: ffmpeg -i{1}-f segment -segment_frames {2}-reset_timestamps 1 -map 0:a -c:a copy -vn -sn -loglevel quiet "{3}/% daudio_{4}.mp4", where {1}=input file path;

{2}=audio cut plan;

{3}=path for the newly generated audio clips.

{4}=index for the newly generated audio clips.

The above command cuts the audio at an arbitrary size.

In an example, cutting the media file 1500 at IDR-frame boundaries may be achieved as follows. Every frame has per-frame metadata like the metadata shown in FIGS. 20*a* and 20*b*. The entries "iskey" and "type" (reference 2010 in FIG. 20*b*) indicate whether a frame is an IDR frame. If iskey=1 and type=I, then the frame in question is an IDR frame; otherwise, it is not an IDR frame. Thus, partitioning the video data into video clips may proceed by cutting video's 'mdat' whenever a new frame is encountered for which iskey=1 and type=I.

To make a new video clip:

Read and save 'mdat'.

Modify metadata according to the clip itself. The metadata contains information like "when is the video created," "duration of the video," "location of each frame," etc. all of which may be changed accordingly.

FIG. 21 shows an example table of metadata values that has been formed by extracting and analyzing the metadata of a media file. The depicted table of FIG. 21 may be provided as part of the above-described metadata file and may be rendered in any suitable format.

Data analysis for generating the table of FIG. 21 may begin by inspecting the 'mdat' of all tracks of the media file (e.g., an MP4 file). A track having the smallest chunk offset may be identified, and the identified track may be associated with a current chunk. Information about the current chunk may be calculated and recorded by extracting metadata from the corresponding track. A next chunk is then processed using the same procedure, and processing repeats in this manner, chuck-by-chunk, until all of the chunks represented in the 'mdat' have been processed.

The table of FIG. 21 is seen to include multiple columns (fields). Example field definitions are as follows:

chunk chunk number (in order).

bytes_offset: the byte at which the current chunk starts in the original file.

bytes_size: the size of the chunk.

track_name: the track to which the current chunk belongs, <track_type>_<track_id>, e.g. If the chunk comes from the second audio track, the track_name may be "audio_2."

delta_start: the time unit at which the current chunk starts.

delta_end: the time unit at which the current chunk ends.

timescale: the number of time units in one second, i.e., 1 time unit=1/timescale second.

time_range(s): approximate time range of the chunk in the original file. Note: this data has some rounding, but if precise data is desired, the starting time equals #delta_start/timescale and the ending time equals #delta_end/timescale.

tgt_file_name: the file(s) into which this chunk will go after partition. Normally identifies a single file, but may identify multiple files if chunk contains more than one IDR frame. In such cases, the chunk may be partitioned into multiple portions (at IDR-frame boundaries) and the portions may be stored in respective files.

Segment ID: an identifier of the segment 170 that contains the respective chunk. This field may be used in place of tgt_file_name in some implementations, e.g., those which do not store segments in the form of files.

tgt_bytes_offset: the byte at which the chunk starts in its new file. If chunk is stored across multiple files (as described above), a respective starting offset may be provided for each new file. Note: The offset does not start at the very beginning (byte 0) because there is always 'ftyp' and 'free' in front of the actual data/ 'mdat'. The hierarchy of generated mp4 files is always 'ftyp'-'free'-'mdat'-'moov' tgt_bytes_size: the size of the chunk in the new file. Normally, tgt_bytes_size and bytes_size should be equal. However, in special cases where chunk is stored across multiple files (as described above), this field value can be a list, where each element in the list shows how many bytes each portion of the chunk occupies in the file in which that portion is placed. At this time, the summation of elements on this list should be equal to bytes_size.

In some examples, various ones of the fields of FIG. 21 may be omitted. For example, some embodiments may be limited to #chunk, byte_offset, bytes_size, track_name, time_range, and target, which may provide a target file name or segment identifier. Thus, the fields as shown are intended to be illustrative rather than limiting.

One should appreciate that the table of FIG. 21 promotes a convenient way of locating particular audio, video, or subtitle data. Such data may be located based on time ranges, byte ranges, chunk numbers, and other factors or combinations of factors. Although the table of FIG. 21 shows a wide range of metadata in a single data structure (e.g., a CSV file), one should appreciate that multiple data structures may be used instead of a single one, and that such data structure(s) may take a variety of forms.

Figure 22A:
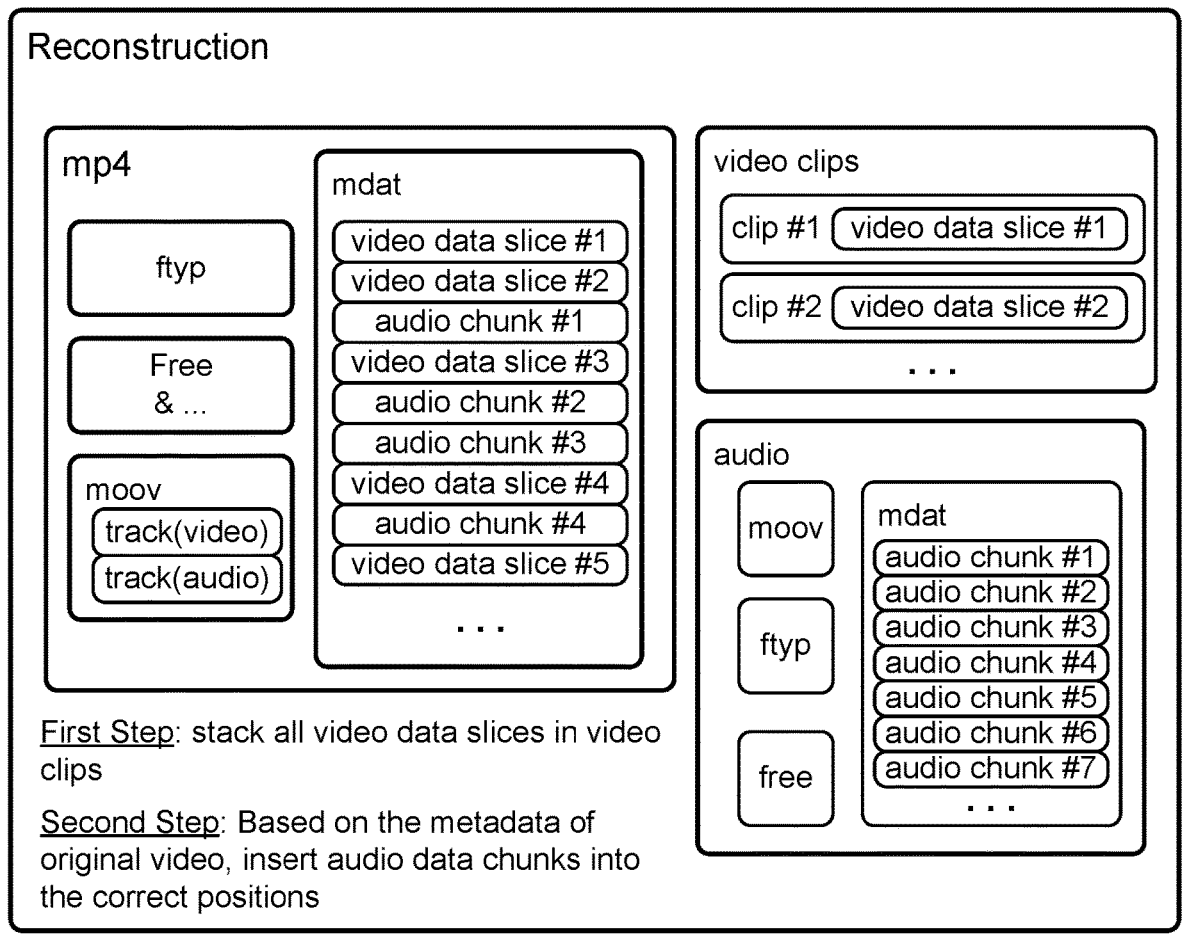

FIG. 22a shows a first example reconstruction process. Reconstruction may be performed, for example, by the gateway 110 (FIG. 6) upon receiving video clips and/or audio clips from storage nodes 120 of the storage cluster 130.

Three sub-boxes are shown in FIG. 22a. The box labeled "mp4" shows the reconstructed media file, which preferably matches the original media file. The other two boxes ("video clips" and "audio") are the files that were extracted during partitioning. In an example, only the reconstructed media file is provided to clients. The video clips and audio clips are used internally but are not necessarily made available to clients.

The depicted reconstruction procedure may produce as output a newly reconstructed media file, named videoname_recon.mp4, which may be placed in the folder constructed by the partition command introduced above. In some examples, the output further includes a printout of the time used to complete the process and a result of comparing the newly reconstructed file with the original file to confirm that the two are identical (e.g., using diff).

As a more specific example, the reconstruction process may include the following steps:

Step 1: Preparation before reading in video and audio's 'mdat'.
Split the metadata (saved from the partition command) into all parts that appear before the 'mdat' section and all parts that appear after the 'mdat' section.
Write the before 'mdat' section into the final file and save the after 'mdat' section for later.
We also examine whether a section of data is video or audio using 'hdlr': '68646c72'.

Step 2: Combine all video data from clips into a single, final file. For each clip (in order),
Find the 4 bytes that identify 'mdat,' which is b'6d646174'.
Get the 'mdat' and append it to a temporary file of pure video data.

Step 3: Insert video and audio's mdat into the final file.
Find the offset of each chunk of the audio data by extracting information from 'stsc': '73747363', 'stsz': '7374737a', and 'stco': '7374636f' in its metadata.
For every chunk of the audio data (saved from the previous partition command): compare the offsets of the audio data chunk and the video data chunk; and insert the one that has a smaller offset into the final reconstruction file (since a smaller offset means that the particular chunk appears earlier).
finally, insert the after 'mdat' section from step one to complete the reconstruction.

FIG. 22b shows a second example reconstruction process. The process of FIG. 22b may be used to reconstruct a media file that was partitioned using the process of FIG. 19b.

FIG. 23a shows an example file system display of results of partitioning an mp4 video named "three_audio.mp4" using the partitioning arrangement of FIG. 19a. Although partitioned components are shown as being stored in files and folders, this is merely an example provided for demonstration. For example, other embodiments do not require that partitioned components be stored in files or folders.

After the partitioning command: logfile.txt, three_audio.meta, and the folders "other_streams" and "clips" are produced (all saved in a folder with the same name as the original mp4).

FIG. 23b shows example results of reconstructing the same file. After the reconstruction command, three_audio_recon.mp4 is produced and compared it with original mp4.

Figure 24A:
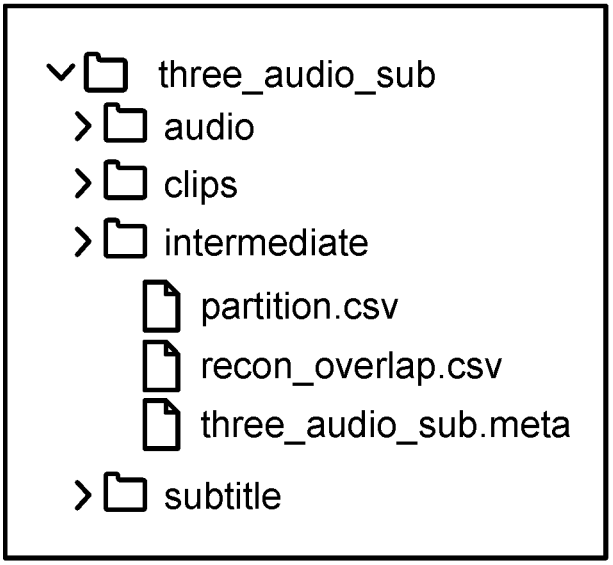
FIGS. 24a and 24b are respective displays, according to a second example, of directory structures after partitioning a media file (FIG. 24a) and after reconstructing the media file (FIG. 24b).
Figure 24B:
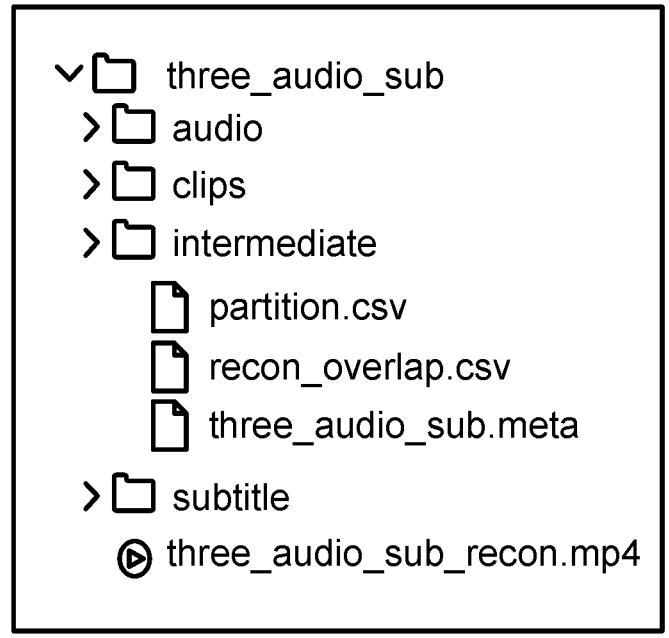

FIG. 24a shows example results of partitioning an mp4 video named "three_audio.mp4" using the partitioning arrangement of FIG. 19b. Here, separate folders are provided for audio, clips (video), and subtitle, reflecting the results of partitioning in FIG. 19b. FIG. 24b shows example results of reconstructing the same file.

Figure 25:
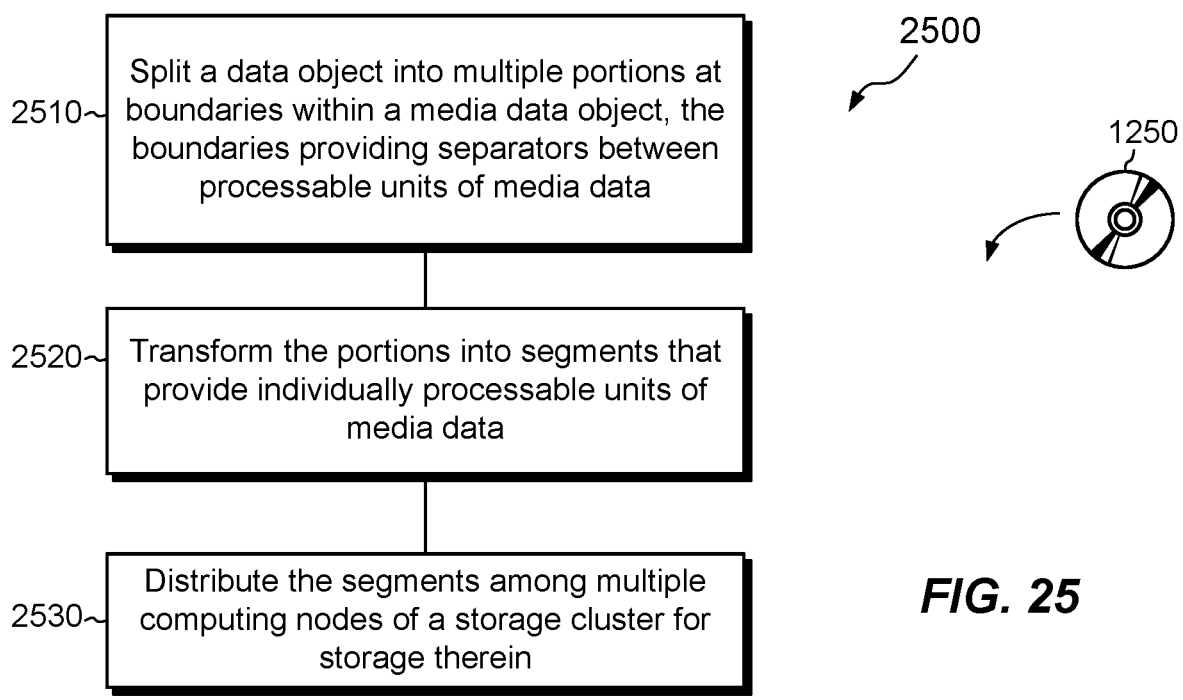
FIG. 25 is a flowchart showing an example method of managing media data.

FIG. 25 shows an example method 2500 of managing media data and provides a summary of some the features described above. At 2510, a media data object 160 (see also object 1500 in FIG. 15) is split into multiple portions 250 at boundaries 252 within the media data object 160 (see FIG. 2). At 2520, the portions 250 are transformed into segments 170 that provide individually processable units of media data, such as individually playable clips of video and/or audio, which may be viewed or processed by analytics. For example, data and/or metadata may be copied from the media file 1500 to various segments 170, and other modifications may be made, to reduce or eliminate dependencies between and among segments. At 2530, the segments 170 are distributed among multiple computing nodes 120 of a storage cluster 130 for storage therein.

An improved technique has been described for processing media data. The technique includes partitioning a media data object 1500 into portions 250 at boundaries 250 within the media data object 1500. The technique further includes transforming the portions 250 of the media data object into segments 170 that provide individually processable units and distributing the segments 170 among multiple computing nodes 120 of the storage cluster 130 for storage therein.

Having described certain embodiments, numerous alternative embodiments or variations can be made. For example, although embodiments have been described for partitioning an MP4 container file, embodiments hereof are not limited to such files but rather may be practiced with any media file or media object.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 1250 in FIG. 25). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing media data, comprising:
splitting a media data object into multiple portions at boundaries within the media data object;
transforming the portions into segments that provide individually processable units of media data; and
distributing the segments among multiple computing nodes of a storage cluster for storage therein,
wherein splitting the media data includes providing an overlap region between two consecutive segments such that the consecutive segments contain respective regions having identical media data, the overlap region having a configurable size based at least in part on a type of processing to be performed individually on the consecutive segments.

2. The method of claim 1, wherein splitting the media data object into portions includes defining multiple portions that contain video data corresponding to respective intervals of time.

3. The method of claim 2, wherein the defined portions that contain video data contain no audio data.

4. The method of claim 2, wherein splitting the media data object into portions further includes providing at least one portion that contains audio data but no video data.

5. The method of claim 2, wherein splitting the media data object into portions further includes defining multiple portions that contain audio data corresponding to respective intervals of time but contain no video data.

6. The method of claim 5, wherein the media data object includes audio data for multiple audio tracks, and wherein each of the portions that contain audio data includes audio data for all of the multiple audio tracks for the respective interval of time.

7. The method of claim 2, wherein splitting the media data object into portions further includes providing at least one portion that contains subtitle data.

8. The method of claim 2, wherein the two consecutive segments are of a same type, the type being one of video, audio, or subtitle.

9. The method of claim 8, further comprising defining a size of the overlap region based on at least one of (i) a specified duration of time and (ii) a specified number of frames.

10. The method of claim 9, wherein the media data object includes video data having a frame rate, and wherein defining the size of the overlap region is based on a longer of (i) the specified duration of time and (ii) the specified number of frames.

11. The method of claim 9, wherein the size of the overlap regions is a user-definable setting.

12. The method of claim 8, wherein splitting the media data object into portions at boundaries within the media data object includes:
identifying a first IDR (Instantaneous Decoder Refresh) frame at a first location in video data of the media data object;
identifying a second IDR frame at a second location in the video data, the second IDR frame corresponding to a later point in time than the first IDR frame;

ending a first portion of the media data object at the second location; and beginning a second portion of the media data object at the first location, the first portion and the second portion thereby defining the overlapping region, which extends between the first location and the second location.

13. The method of claim 12, wherein the video data of the media data object includes at least one intervening IDR frame between the first IDR frame and the second IDR frame.

14. The method of claim 2, wherein transforming the portions into segments includes rendering the portions as standalone, playable media content.

15. The method of claim 14, further comprising storing an AI (artificial intelligence) filter, configured to process one or more of the segments, among the computing nodes of the storage cluster.

16. The method of claim 15, further comprising executing the Al filter on a single segment without reference to any other segments.

17. The method of claim 16, wherein the Al filter includes a neural network configured to identify a specified class of objects or behavior.

18. The method of claim 14, wherein rendering the portions as standalone, playable media content includes creating respective containers for the portions, the containers including metadata based on respective contents of the media data object.

19. The method of claim 2, wherein the media data object includes multiple chunks, each chunk including contiguous, time-ordered data for one of (i) video data, (ii) audio data, or (iii) subtitle data, and wherein the method further comprises storing a metadata index that associates chunks with respective byte ranges within the media data object, the metadata index thereby enabling access to chunks based on byte range.

20. The method of claim 2, wherein the media data object includes multiple chunks, each chunk including contiguous, time-ordered data for one of (i) video data, (ii) audio data, or (iii) subtitle data, and wherein the method further comprises storing a metadata index that associates chunks with respective time ranges within the media data object, the metadata index thereby enabling access to chunks based on time range.

21. The method of claim 1, further comprising reconstructing the media data object from the distributed segments.

22. A computerized apparatus, comprising control circuitry that includes a set of processors coupled to memory, the control circuitry constructed and arranged to:

split a media data object into multiple portions at boundaries within the media data object;

transform the portions into segments that provide individually processable units of media data; and distribute the segments among multiple computing nodes of a storage cluster for storage therein, wherein the control circuitry constructed and arranged to split the media data is further constructed and arranged to provide an overlap region between two consecutive segments such that the consecutive segments contain respective regions having identical media data, the overlap region having a configurable size based at least in part on a type of processing to be performed individually on the consecutive segments.

23. A computer program product including a set of non-transitory, computer-readable media having instructions which, when executed by control circuitry of a computerized apparatus, cause the computerized apparatus to perform a method of managing media data, the method comprising:

splitting a media data object into multiple portions at boundaries within the media data object;

transforming the portions into segments that provide individually processable units of media data; and distributing the segments among multiple computing nodes of a storage cluster for storage therein, wherein splitting the media data includes providing an overlap region between two consecutive segments such that the consecutive segments contain respective regions having identical media data, the overlap region having a configurable size based at least in part on a type of processing to be performed individually on the consecutive segments.

24. The method of claim 2, further comprising storing segment metadata that associates segments of the media data object with locations in the storage cluster where the respective segments are stored.

25. The method of claim 1, wherein the two consecutive segments include video data and the type of processing to be performed individually on the consecutive segments includes video analytics processing.

26. The method of claim 25, wherein the video analytics processing is performed using an AI (artificial intelligence) filter, and wherein the configurable size is defined based on a warm-up time of the Al filter.

* * * * *